US012302395B2

United States Patent
Xu et al.

(10) Patent No.: US 12,302,395 B2
(45) Date of Patent: May 13, 2025

(54) MULTIPLE STARTING POINTS IN RELATION TO A CHANNEL OCCUPANCY TIME (COT) FOR SIDELINK COMMUNICATION

(71) Applicant: QUALCOMM Incorporated, San Diego, CA (US)

(72) Inventors: Changlong Xu, Beijing (CN); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 17/995,781

(22) PCT Filed: May 27, 2020

(86) PCT No.: PCT/CN2020/092633
§ 371 (c)(1),
(2) Date: Oct. 7, 2022

(87) PCT Pub. No.: WO2021/237515
PCT Pub. Date: Dec. 2, 2021

(65) Prior Publication Data
US 2023/0171807 A1    Jun. 1, 2023

(51) Int. Cl.
*H04W 74/0816*    (2024.01)
*H04L 27/26*    (2006.01)
(Continued)

(52) U.S. Cl.
CPC ... *H04W 74/0816* (2013.01); *H04L 27/26025* (2021.01); *H04L 27/2605* (2013.01); *H04W 52/52* (2013.01); *H04W 74/0866* (2013.01)

(58) Field of Classification Search
None
See application file for complete search history.

(56) References Cited

U.S. PATENT DOCUMENTS

2010/0262575 A1* 10/2010 Moore ............... G06F 17/18
                                                    706/59
2019/0200386 A1*  6/2019 Yang .................. H04W 74/0808
(Continued)

FOREIGN PATENT DOCUMENTS

CN    107079494 A    8/2017
CN    110474754 A    11/2019
(Continued)

OTHER PUBLICATIONS

Supplementary European Search Report—EP20937922—Search Authority—The Hague—Jan. 3, 2024.
(Continued)

*Primary Examiner* — Anh Vu H Ly
(74) *Attorney, Agent, or Firm* — Haynes and Boone LLP

(57) ABSTRACT

Wireless communications systems and methods related to communicating a sidelink communication among sidelink user equipment devices (UEs) are provided. A UE may determine a first starting point from a plurality of starting points and perform a listen-before-talk (LBT) to contend for a channel occupancy time (COT) beginning at the first starting point. The UE may transmit, during the COT based on the LBT, a sidelink communication beginning at the first starting point.

29 Claims, 11 Drawing Sheets

(51) Int. Cl.
*H04W 52/52* (2009.01)
*H04W 74/08* (2009.01)

(56) References Cited

U.S. PATENT DOCUMENTS

| | | | | |
|---|---|---|---|---|
| 2021/0092783 | A1* | 3/2021 | Sun | H04W 76/15 |
| 2021/0105815 | A1* | 4/2021 | Salem | H04W 16/14 |
| 2021/0195637 | A1* | 6/2021 | Xue | H04W 74/0808 |
| 2022/0167407 | A1* | 5/2022 | Oviedo | H04W 74/0808 |
| 2023/0032015 | A1* | 2/2023 | Xu | H04W 74/0808 |
| 2023/0146161 | A1* | 5/2023 | Sun | H04W 74/0816 |
| | | | | 370/329 |

FOREIGN PATENT DOCUMENTS

| | | |
|---|---|---|
| CN | 110958711 A | 4/2020 |
| CN | 110972275 A | 4/2020 |
| EP | 3817428 A1 | 5/2021 |
| WO | 2017025004 A1 | 2/2017 |
| WO | 2017125077 A1 | 7/2017 |
| WO | 2020024854 A1 | 2/2020 |
| WO | 2020032532 A1 | 2/2020 |
| WO | 2021126402 | 6/2021 |
| WO | 2021195960 A1 | 10/2021 |

OTHER PUBLICATIONS

Broadcom: "Discussion on Short Fixed Duration LBT for Transmissions Outside a COT", 3GPP TSG RAN WG1 Meeting #96, R1-1903370, Athens, Greece, Feb. 25-Mar. 1, 2019, Feb. 26, 2019 (Feb. 26, 2019) the Whole Document, 6 Pages.

International Search Report and Written Opinion—PCT/CN2020/092633—ISA/EPO—Feb. 9, 2021.

Qualcomm Incorporated: "Channel Access Procedures for NR Unlicensed", 3GPP TSG RAN WG1 Meeting #99, R1-1912938, Reno, USA, Nov. 18-Nov. 22, 2019, Nov. 8, 2019, XP051823701.

* cited by examiner

MULTIPLE STARTING POINTS IN RELATION TO A CHANNEL OCCUPANCY TIME (COT) FOR SIDELINK COMMUNICATION

CROSS-REFERENCE TO RELATED APPLICATIONS

The present application is a 35 U.S.C. 371 National Phase entry of Patent Cooperation Treaty (PCT) Application No. PCT/CN2020/092633, filed May 27, 2020, which is hereby expressly incorporated herein by reference in its entirety.

TECHNICAL FIELD

This application relates to wireless communication systems, and more particularly to multiple starting points of a channel occupancy time (COT) for sidelink communication between user equipment devices (UEs).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may communicate with a UE in an uplink direction and a downlink direction. Sidelink was introduced in LTE to allow a UE to send data to another UE without tunneling through the BS and/or an associated core network. The LTE sidelink technology had been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed bands and/or unlicensed bands.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication performed by a sidelink user equipment (UE), includes: determining a first starting point from a plurality of starting points; performing a listen-before-talk (LBT) to contend for a channel occupancy time (COT) beginning at the first starting point; and transmitting, during the COT based on the LBT, a sidelink communication beginning at the first starting point.

In an additional aspect of the disclosure, a user equipment (UE) includes a processor configured to: determine a first starting point from a plurality of starting points; and perform a listen-before-talk (LBT) to contend for a channel occupancy time (COT) beginning at the first starting point; and a transceiver configured to transmit, during the COT based on the LBT, a sidelink communication beginning at the first starting point.

In an additional aspect of the disclosure, a non-transitory computer-readable medium having program code recorded thereon, the program code including code for causing a sidelink user equipment (UE) to determine a first starting point from a plurality of starting points; code for causing the sidelink UE to perform a listen-before-talk (LBT) to contend for a channel occupancy time (COT) beginning at the first starting point; and code for causing the sidelink UE to transmit, during the COT based on the LBT, a sidelink communication beginning at the first starting point.

In an additional aspect of the disclosure, a user equipment (UE) includes means for determining a first starting point from a plurality of starting points; means for performing a listen-before-talk (LBT) to contend for a channel occupancy time (COT) beginning at the first starting point; and means for transmitting, during the COT based on the LBT, a sidelink communication beginning at the first starting point.

Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
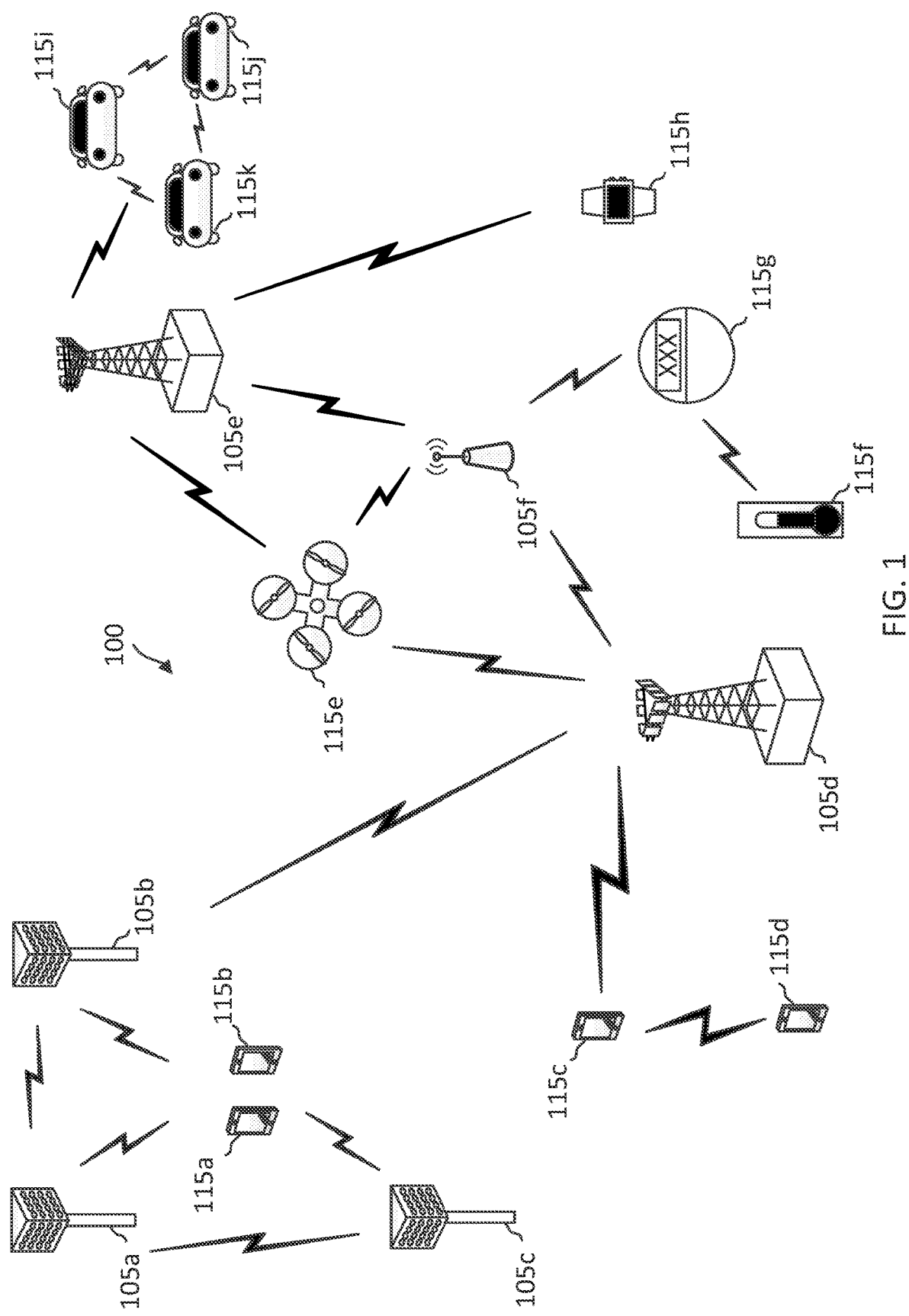
FIG. 1 illustrates a wireless communication network according to one or more aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks. $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11. IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kilohertz (kHz), for example over 5, 10, 20 megahertz (MHz), and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

NR technologies had been extended to operate over an unlicensed spectrum. The deployment of NR technologies over an unlicensed spectrum is referred to as NR-U. NR-U is targeted for operations over the 5 gigahertz (GHz) and 6 GHz bands, where there are well-defined channel access rules for sharing among operators of the same radio access technology (RAT) and/or of different RATs. When a BS operates over an unlicensed spectrum, the BS does not have ownership of the spectrum or control over the spectrum. Thus, the BS contends for channel access in the spectrum, for example, via clear channel assessment (CCA) and/or listen-before-talk (LBT) procedures.

The provisioning of sidelink services, such as device-to-device (D2D), vehicle-to-vehicle (V2V), vehicle-to-everything (V2X), and/or cellular vehicle-to-everything (C-V2X) communications, over dedicated spectrum or licensed spectrum are relatively straight-forward as channel access in the dedicated spectrum or licensed spectrum is guaranteed. NR-U can bring a benefit for sidelink services, for example, by offloading sidelink traffic to the unlicensed spectrum at no cost. However, channel access in a shared spectrum or an unlicensed spectrum is not guaranteed. Thus, to provision for sidelink services over a shared spectrum or unlicensed spectrum, sidelink user equipment devices (UEs) contend for channel access in the spectrum, for example, via CCA and/or LBT procedures.

Sidelink UEs may receive or transmit V2X sidelink communications using a plurality of sidelink slot structure configurations. The plurality of sidelink slot structure configurations may include a first sidelink slot structure configuration for physical sidelink control channel (PSCCH)/physical sidelink shared channel (PSSCH) transmission and a second sidelink slot structure configuration for physical sidelink feedback channel (PSFCH) communication (e.g., receiving PSFCH or transmitting PSFCH). The first sidelink slot structure configuration may include fourteen symbols (e.g., OFDM symbols) in a slot, with thirteen symbols overall for PSCCH/PSSCH and the last symbol in the slot left as a transmission gap (with no transmission). The first symbol of the thirteen symbols may be a repetition of the second symbol in the slot, where the first symbol is at the beginning of the slot and immediately precedes the second symbol. A first symbol immediately precedes a second symbol if the second symbol follows the first symbol and no other symbols are between the first and second symbols. Additionally, the first sidelink slot structure configuration may be devoid of PSFCH. In other words, the beginning symbol of the slot may be followed by twelve consecutive symbols for PSCCH/PSSCH, which is followed by a gap duration in the last symbol of the slot. In the first sidelink slot structure configuration, the first symbol is used for automatic gain control (AGC) and the last symbol is used for a gap. AGC detects the energy of a signal in the channel and applies a hardware gain to maximize the signal amplitude to the dynamic range (for the ADC) at the receiver. The receiver determines a gain for a received signal, and an AGC duration allows time for the receiver to determine the gain and apply the gain (e.g., hardware gain component) such that when the receiver receives the data (e.g., in the next symbol), the gain has already been adjusted.

The second sidelink slot structure configuration may include fourteen symbols (e.g., OFDM symbols) in a slot, with ten symbols overall for PSCCH/PSSCH transmission. In the second sidelink slot structure configuration, the first symbol of the slot may be a repetition of the second symbol in the slot, where the first symbol is at the beginning of the slot and immediately precedes the second symbol. The first symbol is followed by nine consecutive symbols for PSCCH/PSSCH, which is followed by a first gap duration. The first gap duration is followed by a second repetition symbol that is a repetition of the PSFCH symbol, where the second repetition symbol immediately precedes the PSFCH symbol. A second gap duration follows the PSFCH symbol and is the last symbol of the slot.

A sidelink UE may initiate an LBT to acquire a COT on its own, without being controlled by a centralized structure (e.g., a BS 105 in the network 100). Accordingly, multiple initiating sidelink UEs may contend for the medium to acquire a COT at the same time or about the same time. For example, the multiple UEs may each start performing an LBT at the same slot or mini-slot boundary. Accordingly, the system may become congested with the multiple initiating sidelink UEs, which may each experience a high number of LBT fails. Additionally or alternatively, the transmission starting point for the multiple UE's may be aligned to the same slot boundary or mini-slot boundary. If multiple initiating sidelink UEs transmit data at the same time or around the same time, interference between the UEs may occur. Additionally, similar problems may arise in the case of CG-UL if multiple UEs start CG-UL at the same time for acquiring a COT. It may be desirable to provide a congestion control mechanism for sidelink communications.

The present application describes mechanisms for providing a plurality of starting points for a channel occupancy time (COT) for sidelink communications in a frequency band among sidelink UEs. The plurality of starting points may case congestion by allowing multiple UEs to perform LB and/or start transmission of a sidelink communication at different times relative to each other.

In some aspects, an initiating sidelink UE may define a plurality of starting points for transmitting a sidelink communication and determine a first starting point from the plurality of starting points. The UE may perform a CAT4 LBT to contend for the COT and start transmission of a sidelink communication beginning at the selected starting point if the CAT4 LBT results in an LBT pass. After acquiring the COT, the UE may transmit a sidelink data via a physical sidelink shared channel (PSSCH), a physical sidelink control channel (PSCCH), and/or a physical sidelink feedback channel (PSFCH) to another sidelink UE. The UE that acquires the COT may be referred to as an initiating UE and may transmit sidelink control information (SCI) indicating COT sharing information. A UE that monitors for the SCI may be referred to as a monitoring UE. Additionally, a UE that does not acquire the COT, but shares the COT acquired by another UE, may be referred to as a responding UE.

Certain frequency bands may have certain channel occupancy requirements. A channel occupancy may be defined by continuous transmissions in the channel. In slot-based transmissions, the initiating UE may continue to communicate during and share a COT as long as the initiating UE continues to occupy the channel. Due to channel occupancy requirements, a UE may agree to surrender the channel if the UE has not occupied the channel for an LBT gap time threshold. In some instances, depending on the selected starting point, a first duration between the selected starting point of the COT and the next symbol may allow another UE to intervene and transmit during the first duration. To avoid this issue, the UE may fill the first duration by transmitting a CP extension during the first duration. For example, the UE may apply the CP extension to a sidelink transmission and transmit the sidelink communication with the CP extension. In some instances, if the selected starting point is within a symbol that includes an automatic gain control (AGC) symbol, the UE may puncture a portion of the symbol and transmit a sidelink communication beginning at the starting point of the COT. Mechanisms for selecting a starting point from a plurality of starting points and transmitting a sidelink communication beginning at the starting point of the COT are described in greater detail herein.

Aspects of the present disclosure can provide several benefits. For example, allowing a UE to select a starting point from a plurality of starting points for transmitting a sidelink communication may reduce the congestion for UEs initiating COTs. Accordingly, the UE may have a higher likelihood of transmitting a sidelink communication beginning at the selected starting point. In another example, applying the CP extension having the CP extension length to the initiating UE's sidelink transmission may allow the UE to transmit a sidelink communication without interfering with another UE. Thus, the disclosed examples can consume less time and fewer resources.

FIG. 1 illustrates a wireless communication network 100 according to one or more aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for DL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network operating over an unlicensed frequency band. In such an aspect, the BSs 105 and the UEs 115 may be operated by multiple network operating entities. To avoid collisions, the BSs 105 and the UEs 115 may employ an LBT procedure to monitor for transmission opportunities (TXOPs) in the shared channel. A wireless communication device may perform an LBT in the shared channel. LBT is a channel access scheme that may be used in the unlicensed spectrum. When the LBT results in an LBT pass (the wireless communication device wins contention for the wireless medium), the wireless communication device may access the shared medium to transmit and/or receive data. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel. Conversely, the LBT results in a failure when a channel reservation signal is detected in the channel. A TXOP may also be referred to as channel occupancy time (COT).

Sidelink communication refers to the communications among UEs without tunneling through a BS and/or a core network. For example, sidelink communications may refer to communications between two devices without going through a BS. Sidelink communication can be communicated over a physical sidelink control channel (PSCCH) and a physical sidelink shared channel (PSSCH). The PSCCH and PSSCH are analogous to a physical downlink control channel (PDCCH) and a physical downlink shared channel (PDSCH) in downlink (DL) communication between a BS and a UE. For instance, the PSCCH may carry sidelink control information (SCI) and the PSSCH may carry SCI and/or sidelink data (e.g., user data). Each PSCCH is associated with a corresponding PSSCH, where SCI in a PSCCH may carry reservation and/or scheduling information for sidelink data transmission in the associated PSSCH. In some examples, a UE may transmit PSSCH carrying SCI, which may be indicated in two stages. In a first stage control (SCI-1), the UE may transmit PSCCH carrying information for resource allocation and decoding a second stage control. The first stage SCI may include at least one of a priority, PSSCH resource assignment, resource reservation period (if enabled), PSSCH DMRS pattern (if more than one pattern is configured), a second-stage SCI format (e.g., size of 2nd SCI), an amount of resources for the second-stage SCI, a number of PSSCH demodulation reference signal (DMRS) port(s), a modulation and coding scheme (MCS), etc. In a second stage control (SCI-2), the UE may transmit PSCCH carrying information for decoding the PSSCH. The second stage SCI may include a-bit L1 destination identifier (ID), an 8-bit L1 source ID, a HARQ process ID, a new data indicator (NDI), a redundancy version (RV), etc. Sidelink communication can also be communicated over a physical sidelink feedback control channel (PSFCH), which indicates an acknowledgement (ACK)-negative acknowledgement (NACK) for a previously transmitted PSSCH. Use cases for a sidelink communication may include vehicle-to-everything (V2X), industrial IoT (IIoT), and/or NR-lite.

Some of the UEs 115 may communicate with each other in peer-to-peer communications. For example, a first UE may communicate with a second UE over a sidelink. In some instances, the sidelink may be a unicast bidirectional link, each between a pair of UEs. In some other instances, the sidelink may be multicast links supporting multicast sidelink services among the UEs. For instance, the first UE may transmit multicast data to the second UE over sidelinks. In some aspects, some of the UEs are associated with vehicles (e.g., similar to the UEs 115i-k in FIG. 1) and the communications over the sidelinks may be C-V2X communications. C-V2X communications may refer to communications between vehicles and any other wireless communication devices in a cellular network.

NR supports two modes of radio resource allocations (RRA), a mode-1 RRA and a mode-2 RRA, for sidelink over a licensed spectrum. The mode-1 RRA supports network controlled RRA that can be used for in-coverage sidelink communication. For instance, a serving BS may determine a radio resource on behalf of a sidelink UE and transmit an indication of the radio resource to the sidelink UE. The serving BS may provide a dynamic grant or may activate a configured sidelink grant for sidelink communications. Sidelink feedback can be reported back to the BS by the transmitting UE. The mode-2 RRA supports autonomous RRA for sidelink UEs to perform autonomous sidelink communications over a shared radio frequency band (e.g., in a shared radio spectrum or an unlicensed spectrum). In some aspects, the shared radio frequency band may be partitioned into multiple subchannels or frequency subbands. A sidelink UE may be configured to operate in a mode-2 RRA. For instance, the sidelink UE may be configured with a resource pool in the shared radio frequency band. Additionally, the channel access may be in units of sidelink communication frames in time. Each sidelink communication frame may include an LBT gap duration followed by a sidelink resource. A sidelink UE intending to transmit in a frequency subband may perform an LBT in the LBT gap duration. If the LBT is successful, the sidelink UE may proceed to transmit SCI and/or sidelink data in the following sidelink resource.

A plurality of UEs may perform LBT to contend for a COT. Rather than the UE 115 performing the LBT to contend for the COT and/or transmitting a sidelink communication at the same slot or mini-slot boundary as other UEs, the UE 115 may select the starting point from the plurality of starting points and transmit the sidelink communication beginning at the selected starting point. Each UE of the multiple UEs may select different starting points from the plurality of starting points. Accordingly, congestion for sidelink UEs initiating a COT or transmission interference between the UEs may be reduced.

An LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold. A CAT4 LBT refers to an LBT with a random backoff and a variable contention window (CW). The initiating UE may perform a CAT4 LBT to acquire the COT. The CAT4 LBT is typically more complex than a CAT2 LBT because, for example, the timing for a CAT4 LBT is not fixed as it is for a CAT2 LBT.

The present disclosure provides techniques for determining a starting point of a plurality of starting points at which a UE may start transmission of a sidelink communication. Mechanisms for transmitting a sidelink communication beginning at the determined starting point are described in greater detail herein.

Figure 2:
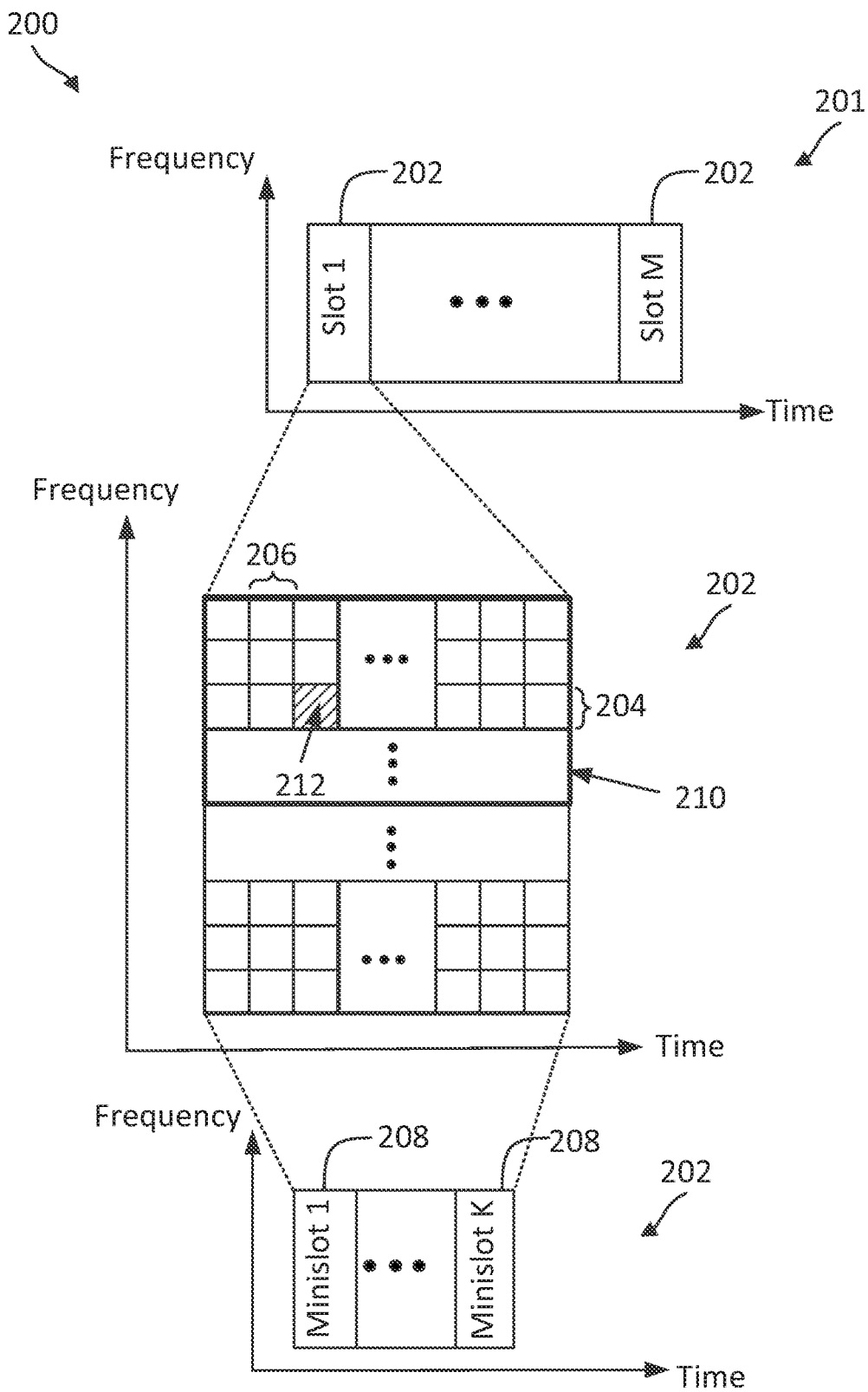
FIG. 2 is a timing diagram illustrating a transmission frame structure according to one or more aspects of the present disclosure.

FIG. 2 is a timing diagram illustrating a transmission frame structure 200 according to one or more aspects of the present disclosure. The transmission frame structure 200 may be employed by BSs such as the BSs 105 and UEs such as the UEs 115 in a network such as the network 100 for communications. The BS may communicate with the UE using time-frequency resources configured as shown in the transmission frame structure 200. Additionally or alternatively, sidelink UEs may autonomously select sidelink resources or identify sidelink resources with network assistance from the BS for sidelink communications. For example, a first sidelink UE may communicate with another sidelink UE using time-frequency resources configured as shown in the transmission frame structure 200. In FIG. 2, the x-axes represent time in some arbitrary units, and the y-axes represent frequency in some arbitrary units.

The transmission frame structure 200 includes a radio frame 201. The duration of the radio frame 201 may vary depending on some aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on, for example, the channel bandwidth, the subcarrier spacing (SCS), and/or the cyclic-prefix (CP) mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time. A resource block group (RBG) may include one or more RBs. A subband may include multiple RBGs.

In an example, a sidelink UE (e.g., UE 115 in FIG. 1) may schedule a sidelink transmission for UL and/or DL communications at a time-granularity of slots 202 or mini-slots 208. Each slot 202 may be time-partitioned into P number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS 105 may schedule the UE 115 at a frequency-granularity of a RB 210 (e.g., including about 12 subcarriers 204).

Figure 3:
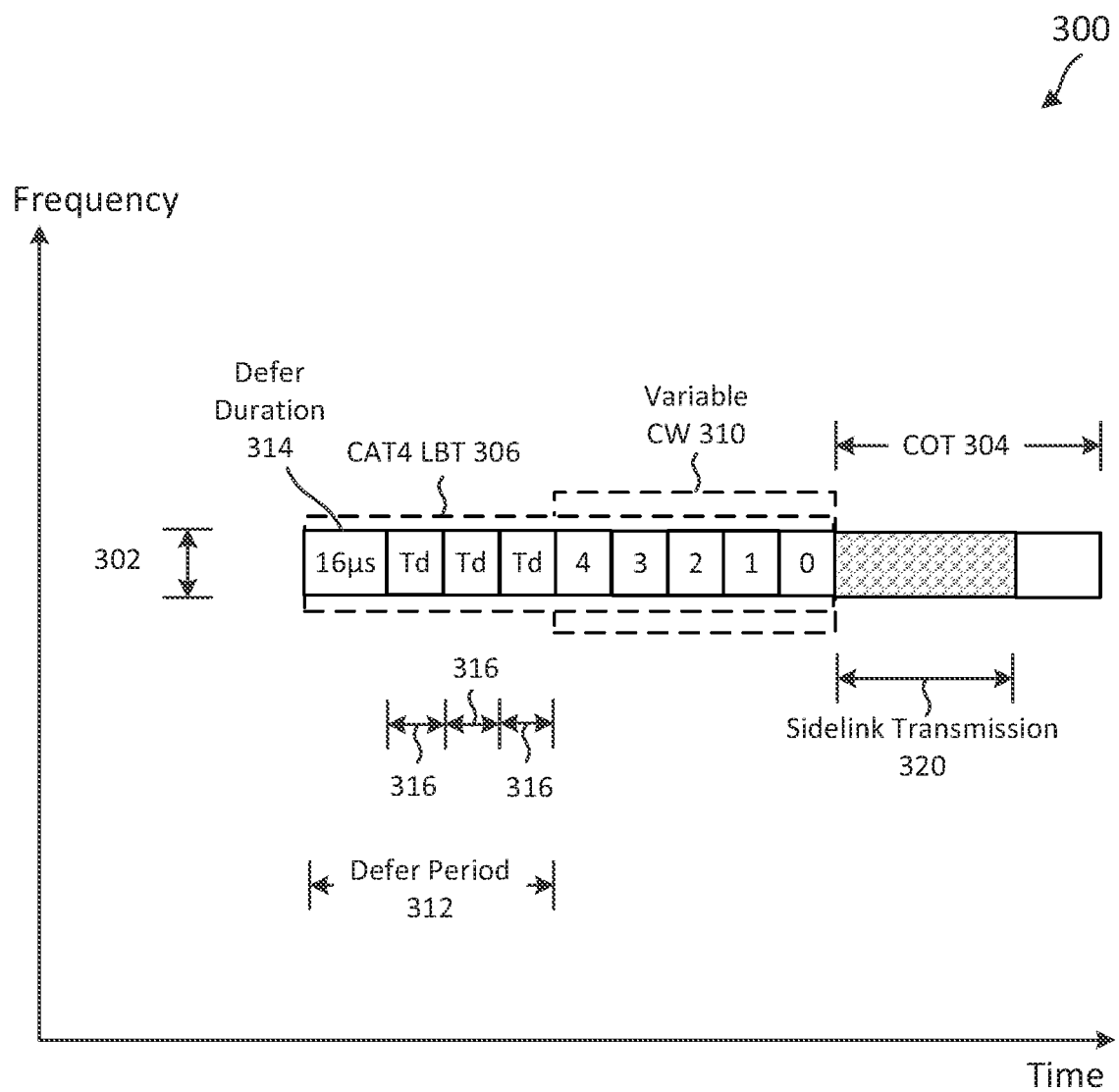
FIG. 3 illustrates an example category 4 listen-before-talk (CAT4 LBT) scheme according to one or more aspects of the present disclosure.

FIG. 3 illustrates an example CAT4 LBT scheme 300 according to one or more aspects of the present disclosure. The CAT4 LBT scheme 300 may be employed by a UE 115 in a network such as the network 100. The x-axis represents time in some arbitrary units.

In the example illustrated in FIG. 3, a frequency band 302 may be a shared radio frequency band or an unlicensed band shared by a plurality of network operating entities. The frequency band 302 may, for example, have a BW of about 10 MHz or about 20 MHz. In an instance, the SCS is about 5 kHz, and the full symbol length may be about 66.68 µs. In an instance, the SCS is about 30 kHz, and the full symbol length may be about 33.34 µs. In an instance, the SCS is about 60 kHz, and the full symbol length may be about 16.67 µs. The frequency band 302 may be located at any suitable frequencies. In some aspects, the frequency band 302 may be located at about 3.5 GHz, 6 GHz, or 20 GHz.

A UE 115 may contend for a COT 304 in the frequency band 302, which may be a shared radio frequency band and/or an unlicensed band, for sidelink communication with another UE over a sidelink. To communicate sidelink communication over the frequency band 302, the UE 115 may perform an LBT to contend for the COT 304 in the frequency band 302. As discussed, LBT may refer to a channel sensing mechanism used by devices (e.g., UE 115) to determine the presence of other signals in the channel prior to transmission and to avoid collisions with other transmissions. A device may sense the medium for a period of time. A CAT4 LBT may refer to an LBT with a random backoff and a variable CW.

In an example, the UE 115 may perform a CAT4 LBT 306 to contend for the COT 304. If the CAT4 LBT 306 results in an LBT fail, the UE 115 may determine that the frequency band 302 is occupied and accordingly may refrain from transmitting in the frequency band 302. For example, the CAT4 LBT 306 may include a defer period 312 including a defer duration 314 and n time delays (Td) 316, where n is a whole number greater than zero. The n parameter may be related to a channel access priority class (CAPC), and each Td 316 may be 9 µs or about 9 µs. In the example illustrated in FIG. 3, the defer duration 314 may be 16 µs or about 16 µs, and n may be three. Accordingly, the defer period 312 may be about 43 µs.

The CAT4 LBT 306 may also include a variable CW 310, which may be calculated in accordance with N time delays (Td) 316, where N is a whole number greater than zero and is randomly and uniformly distributed between 0 and the CW size. A CW may refer to a mechanism that allows for a UE 115 to backoff when there is potential congestion in the frequency band 302. If the UE 115 senses congestion in the frequency band 302, the size of the variable CW 310 may double (up to a maximum size). If the UE 115 senses no congestion in the frequency band 302, the size of the variable CW 310 may reset to a minimum size. The size adjustment may be driven by decoding errors (e.g., a decoding error may be used as an approximation for a collision event). In the example illustrated in FIG. 3, N may be five, and the variable CW 310 may accordingly be about 45 µs.

If the CAT4 LBT 306 is successful, the UE 115 may proceed to use the COT 304 for a sidelink communication 320. In this example, the UE 115 may communicate the sidelink communication 320 with another UE in the frequency band 302 during the COT 304. For example, the UE 115 may acquire the COT 304 and transmit the sidelink communication 320 including PSCCH, PSSCH, and/or PSFCH.

A sidelink UE may initiate an LBT to acquire a COT on its own, without being controlled by a centralized structure (e.g., a BS 105 in the network 100). Accordingly, multiple initiating sidelink UEs may contend for the medium to acquire a COT at the same time or about the same time. For example, the multiple UEs may each start performing an LBT at the same slot boundary. Accordingly, the system may become congested with the multiple initiating sidelink UEs, which may each experience a high number of LBT fails. Additionally or alternatively, the transmission starting point for the multiple UE's may be aligned to the same slot boundary or mini-slot boundary. If multiple initiating sidelink UEs transmit data at the same time or around the same time, interference between the UEs may occur.

Additionally, similar problems may arise in the case of CG-UL if multiple UEs start CG-UL at the same time for acquiring a COT. It may be desirable to provide a congestion control mechanism for sidelink communications. In some aspects, an initiating sidelink UE 115 may define a plurality of starting points for transmitting a sidelink communication and determine a first starting point from a plurality of starting points. The UE 115 may, for example, select a starting point randomly based on a uniform distribution function among the configured starting points. The UE 115 may perform a CAT4 LBT to contend for the COT and start transmission of a sidelink communication beginning at the selected starting point if the CAT4 LBT results in an LBT pass. Depending on the selected starting point, a first duration between the selected starting point of the COT and the next symbol may allow another UE to intervene and transmit during the first duration. To avoid this issue, the UE 115 may fill the first duration by transmitting a CP extension during the first duration. Mechanisms for selecting a starting point from a plurality of starting points and transmitting a sidelink communication beginning at the starting point are provided in the present disclosure.

Figure 4:
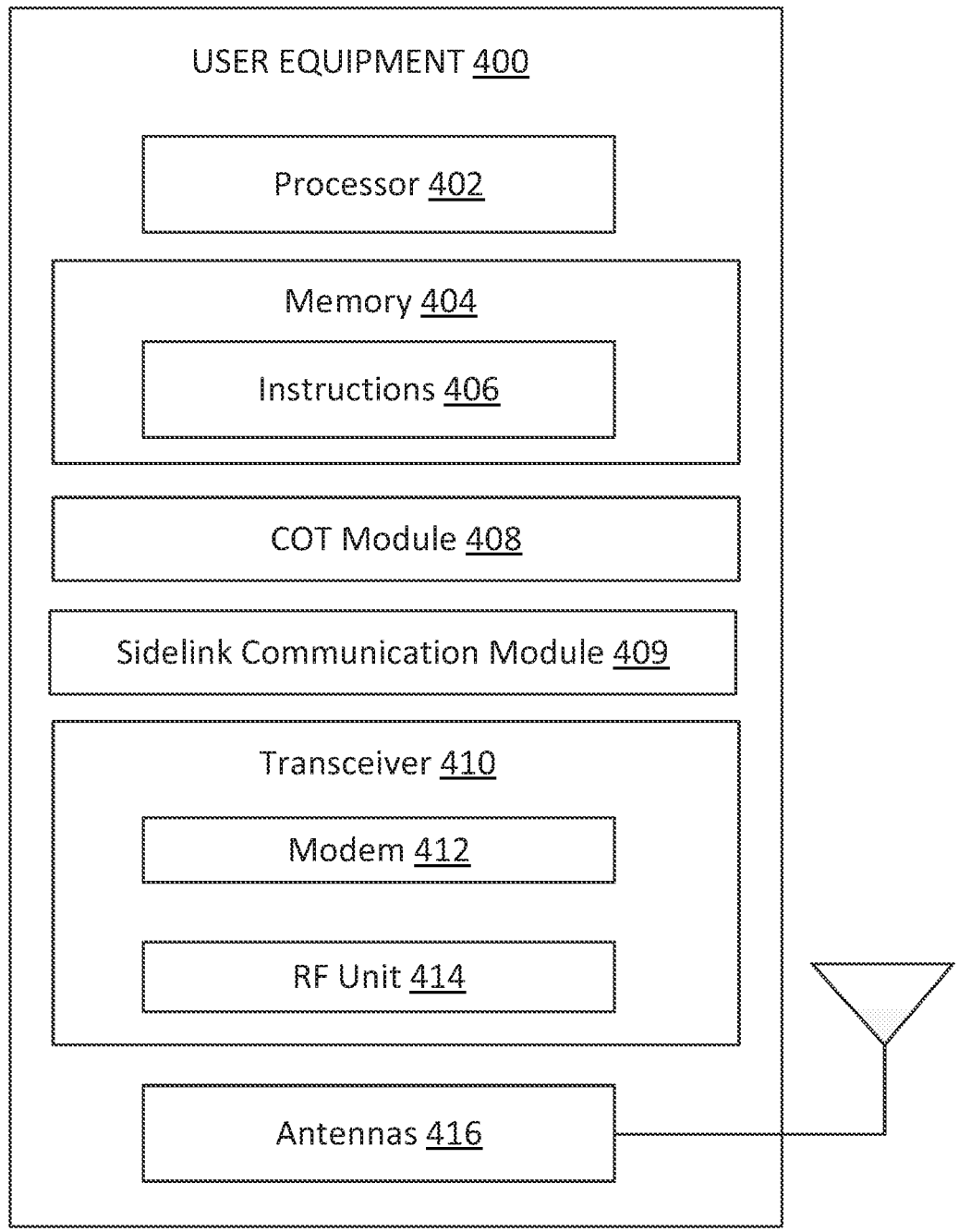
FIG. 4 is a block diagram of an example user equipment (UE) according to one or more aspects of the present disclosure.

FIG. 4 is a block diagram of an example UE 400 according to one or more aspects of the present disclosure. The UE 400 may be a UE 115 discussed above in FIG. 1. As shown, the UE 400 may include a processor 402, a memory 404, a COT module 408, a sidelink communication module 409, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UE 115 in connection with aspects of the present disclosure, for example, aspects of FIGS. 1-3 and 6-11.

Instructions 406 may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The COT module 408 and/or the sidelink communication module 409 may be implemented via hardware, software, or combinations thereof. For example, the COT module 408 and/or the sidelink communication module 409 may be implemented as a processor, circuit, and/or instructions 406 stored in the memory 404 and executed by the processor 402. In some instances, the COT module 408 and/or the sidelink communication module 409 can be integrated within the modem subsystem 412. For example, the COT module 408 and/or the sidelink communication module 409 can be implemented by a combination of software components (e.g., executed by a DSP or a general processor) and hardware components (e.g., logic gates and circuitry) within the modem subsystem 412.

The COT module 408 and/or the sidelink communication module 409 may be used for various aspects of the present disclosure, for example, aspects of FIGS. 1-3 and 6-11. In some aspects, the COT module 408 may be configured to determine a first starting point from a plurality of starting points. The COT module 408 may be configured to performing an LBT to contend for a COT beginning at the first starting point. The sidelink communication module 408 may be configured to transmit, during the COT based on the LBT, a sidelink communication beginning at the first starting point.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404, the COT module 408, and/or the sidelink communication module 409 according to an MCS, e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., PSSCH data and/or PSCCH control information, PSFCH ACK/NACK feedbacks, sidelink communications) from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The transceiver 410 may provide the demodulated and decoded data (e.g., PSSCH data and/or PSCCH control information, PSFCH ACK/NACK feedbacks, sidelink communications) to the COT module 408 and/or the sidelink communication module 409 for processing. The antennas 416 may include multiple antennas of similar or different designs in order to sustain multiple transmission links. The RF unit 414 may configure the antennas 416.

In some instances, the transceiver 410 is configured to transmit, during the COT based on the LBT, a sidelink communication beginning at the first starting point, for example, by coordinating with the sidelink communication module 409. In some instances, the processor 402 is configured to determine a first starting point from a plurality of starting points and/or to perform an LBT to contend for a COT beginning at the first starting point, for example, by coordinating with the COT module 408.

In an aspect, the UE 400 can include multiple transceivers 410 implementing different RATs (e.g., NR and LTE). In an aspect, the UE 400 can include a single transceiver 410 implementing multiple RATs (e.g., NR and LTE). In an aspect, the transceiver 410 can include various components, where different combinations of components can implement different RATs.

Figure 5:
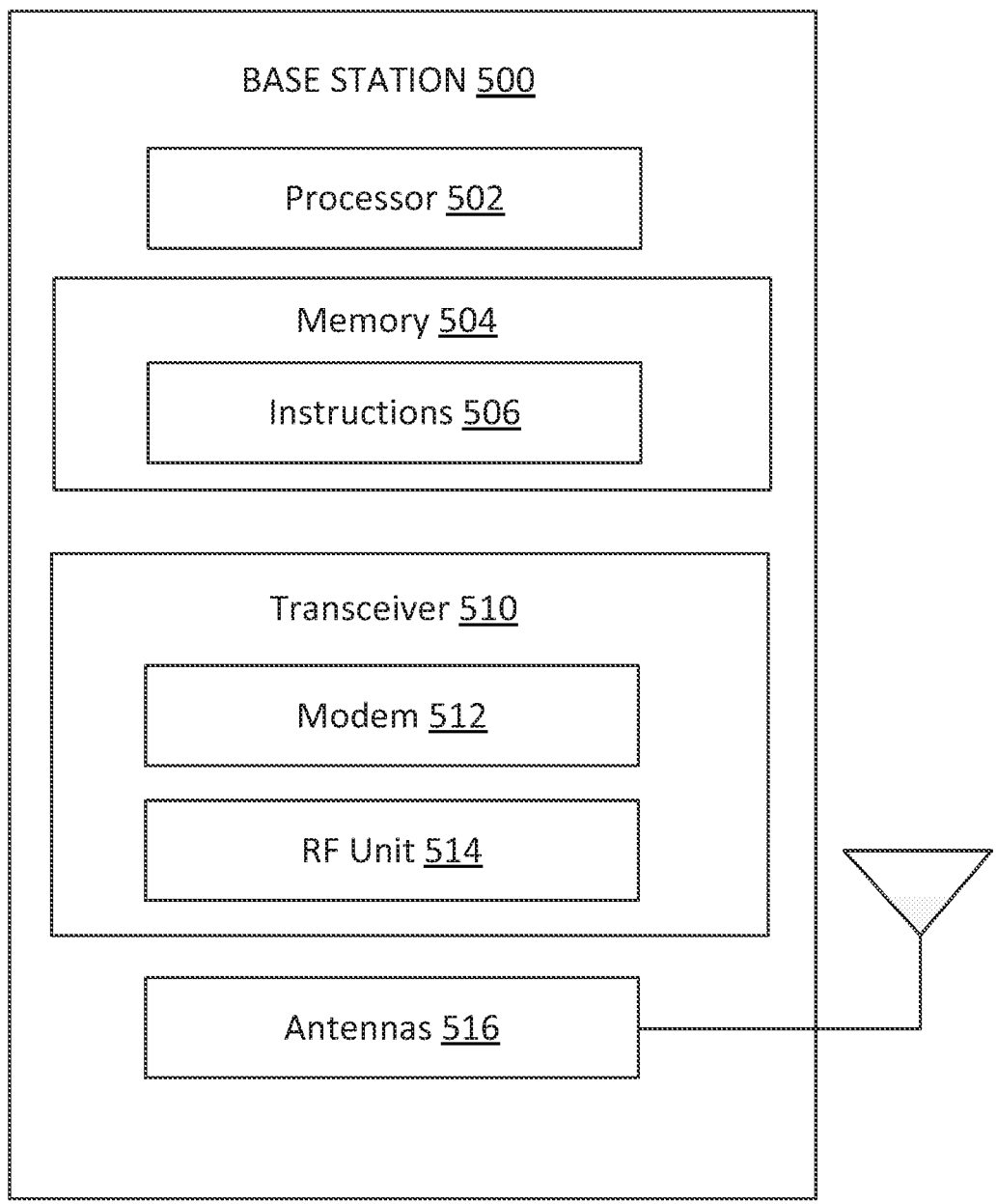
FIG. 5 is a block diagram of an example base station (BS) according to one or more aspects of the present disclosure.

FIG. 5 is a block diagram of an example BS 500 according to one or more aspects of the present disclosure. The BS 500 may be a BS 105 in the network 100 as discussed above in FIG. 1. A shown, the BS 500 may include a processor 502, a memory 504, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIG. 1. Instructions 506 may also be referred to as code, which may be interpreted broadly to include any type of computer-readable statement(s) as discussed above with respect to FIG. 3.

As shown, the transceiver 510 may include the modem subsystem 512 and the RF unit 514. The transceiver 510 can be configured to communicate bi-directionally with other devices, such as the UEs 115 and/or 300 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., a sidelink resource configuration, sidelink COT sharing configuration) from the modem subsystem 512 (on outbound transmissions) or of transmissions originating from another source such as a UE 115, 215, 315, and/or 300. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or UE 300 according to some aspects of the present disclosure. The antennas 516 may further receive data messages transmitted from other devices and provide the received data messages for processing and/or demodulation at the transceiver 510. The transceiver 510 may provide the demodulated and decoded data to any modules of the BS 500 for processing. The antennas 516 may include multiple antennas of similar or different designs in order to sustain multiple transmission links.

In an aspect, the BS 500 can include multiple transceivers 510 implementing different RATs (e.g., NR and LTE). In an aspect, the BS 500 can include a single transceiver 510 implementing multiple RATs (e.g., NR and LTE). In an aspect, the transceiver 510 can include various components, where different combinations of components can implement different RATs.

Figure 6:
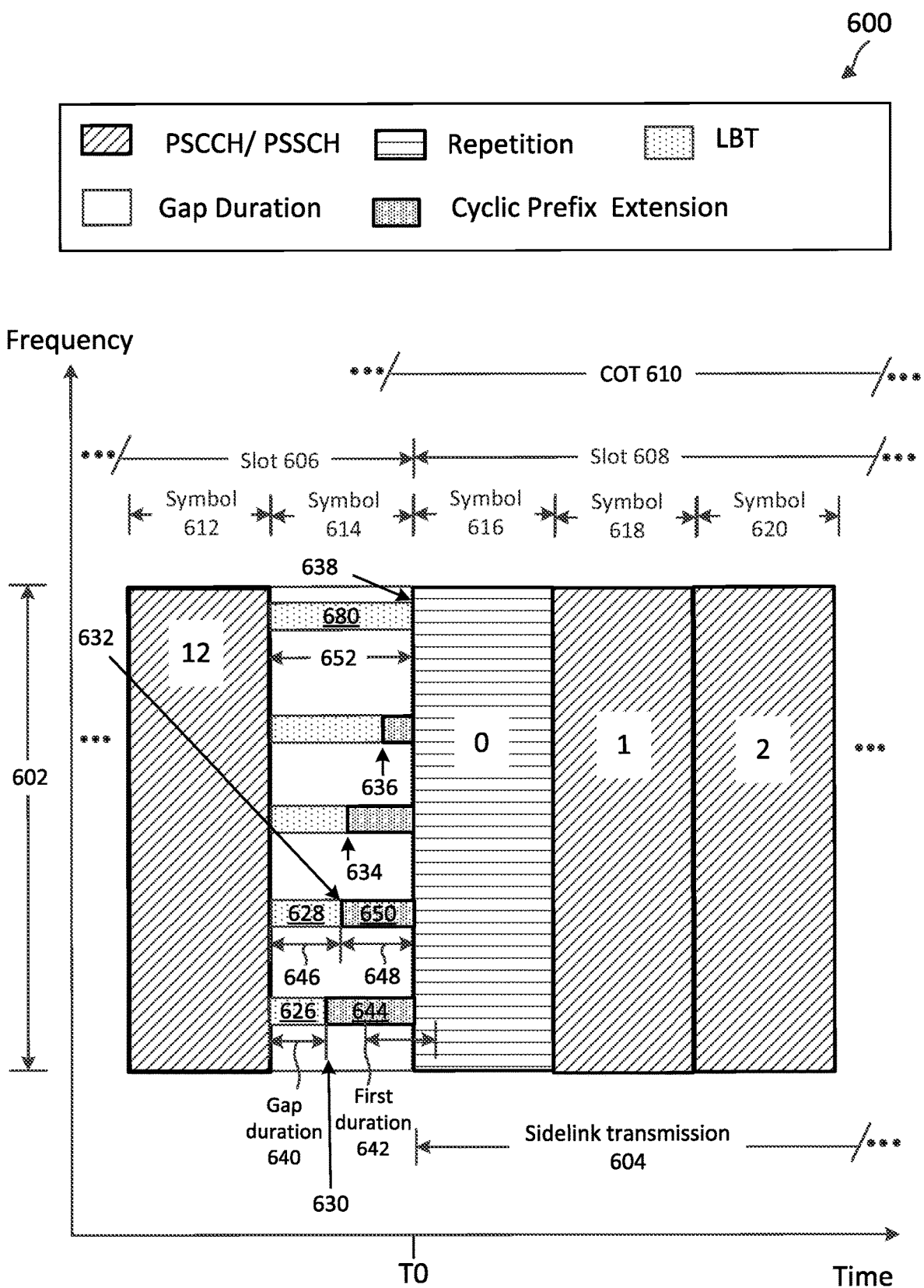
FIG. 6 illustrates a sidelink slot structure scheme for a sidelink transmission according to one or more aspects of the present disclosure.

FIG. 6 illustrates a sidelink slot structure scheme 600 for a sidelink transmission according to one or more aspects of the present disclosure. The scheme 600 may be employed by a UE 115 in a network such as the network 100. The network may support a plurality of starting points for sidelink transmissions between sidelink UEs. The x-axis represents time in some arbitrary units, and the y-axis represents frequency in some arbitrary units.

In the example illustrated in FIG. 6, a frequency band 602 may be a shared radio frequency band or an unlicensed band shared by a plurality of network operating entities. The frequency band 602 may, for example, have a BW of about 10 MHz or about 20 MHz and an SCS of about 15 kHz, about 30 kHz, or about 60 kHz. The frequency band 602 may be located at any suitable frequencies. In some aspects, the frequency band 602 may be located at about 2.5 GHz, 6 GHz, or 20 GHz.

A UE 115 may communicate with one or more other UEs over a sidelink using the sidelink slot structure scheme 600. For example, the UE 115 may transmit a sidelink transmission 604 in a slot 608, which immediately precedes a slot 606, to another sidelink UE in the frequency band 602. A first slot immediately precedes a second slot if the second slot follows the first slot and no other slots are between the first and second slots. The sidelink transmission 604 may be a slot-based transmission that includes PSCCH/PSSCH but is devoid of PSFCH. Additionally, the slot 606, 608 may correspond to a slot 202 in FIG. 2 and may include a plurality of symbols. A duration of the slot 606, 608 may span any suitable number of symbols (e.g., OFDM symbols). In some aspects, the duration of the slot 606, 608 may correspond to one TTI, which may include about fourteen symbols.

The slot 606 may include fourteen symbols including a symbol 612 and a symbol 614. The symbol 612 immediately precedes the symbol 614 and may be used to transmit PSCCH/PSSCH. The symbol 614 is the last symbol of the slot 606 and may be used by multiple UEs for performing LBT to acquire a COT 610 for transmission in the slot 608. The slot 608 may include fourteen symbols including a beginning symbol 616, a symbol 618 and a symbol 620. The beginning symbol 616 may immediately precede the symbol 618, which may immediately precede the symbol 620. The beginning symbol 616 may be a repetition of the symbol 618 and may include an automatic gain control (AGC) symbol. The UE 115 may transmit the sidelink transmission 604 including PSCCH/PSSCH during the symbols 616, 618, and 620.

A UE 115 may contend for the COT 610 in the frequency band 602, which may be a shared radio frequency band and/or an unlicensed band, for sidelink communication with another UE over a sidelink. To communicate the sidelink transmission 604 over the frequency band 602, the UE 115 may perform an LBT to contend for the COT 610 in the frequency band 602. LBT may refer to a channel sensing mechanism used by devices (e.g., UE 115) to determine the presence of other signals in the channel prior to transmission and to avoid collisions with other transmissions. A device may sense the medium for a period of time.

The UE 115 may determine a plurality of starting points 630, 632, 634, 636, and 638 that has been predefined (offset values) before a start of the COT 610. The plurality of starting points 630, 632, 634, 636, and 638 is within the last symbol 614 of the slot 606. Each starting point of the plurality of starting points 630, 632, 634, 636, and 638 may be spaced apart by a starting point gap in-between. The slot 608 may start at Time T0, and the starting point gap may be, for example, 9 μs. For example, the starting point 630 may be at Time T0—36 μs, the starting point 632 may be at Time T0—27 μs, the starting point 634 may be at Time T0—18 μs, the starting point 636 may be at Time T0—9 μs, and the starting point 638 may be at Time T0, which is at a start of the beginning symbol 616 of the slot 608. As will be discussed further below, the UE 115 may fill a gap between the starting point 630, 632, 634, or 636 and a start of the slot 608 with a CP extension if the UE 115 selects the starting point 630, 632, 634, or 636, respectively, as the first starting point. An OFDM transmission (e.g., sidelink transmission 604) may begin at the start of a symbol boundary (e.g., Time T0). If the first starting point occurs before the start of the symbol boundary, the UE 115 may transmit a CP extension until the start of the symbol boundary to block other nodes from accessing the channel. If the UE 115 selects the starting point 638 as the first starting point, it may be unnecessary for the UE 115 to transmit the sidelink communication 604 with a CP extension, as will be discussed further below. The plurality of starting points may be based on an SCS. For example, the number of starting points and/or the locations of the starting points within the symbol 614 may be based on the SCS. In some examples, the SCS is about 15 kHz, about 30 kHz, or about 60 kHz.

The COT 610 may begin at a first starting point of the plurality of starting points 630, 632, 634, 636, and 638 within the last symbol 614 of the slot 606, as discussed in aspects of the present disclosure. For example, the UE 115 may start transmission of the sidelink transmission 604 at any one of the starting points of the plurality starting points 630, 632, 634, 636, and 638.

In some instances, the UE 115 may perform a CAT4 LBT during the last symbol 614 of the slot 606 to contend for the COT 610. If the CAT4 LBT results in an LBT fail, the UE 115 may refrain from transmitting in the frequency band 602 for a time period and then may perform CAT4 LBT again. If the CAT4 LBT results in an LBT pass, the UE 115 may proceed to use the COT 610 for sidelink communication and accordingly may transmit a sidelink transmission beginning at the first starting point. A CAT4 LBT that results in an LBT pass may also be referred to as a successful CAT4 LBT. The transmission of the sidelink transmission 604 is conditioned on a successful CAT4 LBT. The UE 115 starts to perform the CAT4 LBT such that the CAT4 LBT is ready no later than the first starting point. An earlier CAT4 LBT based on a maximum CW size may be desirable.

In some examples, the UE 115 may select the first starting point from the plurality of starting points 630, 632, 634, 636, and 638 in various ways. In some instances, the UE 115 may randomly select one of the five starting points 630, 632, 634, 636, and 638 to start transmission of the sidelink communication. In an instance, the UE 115 may select the first starting point based on a random number from the UE 115 implementation. In an instance, the UE 115 may select the first starting point based on a random function having a uniform distribution.

In some aspects, the UE 115 may select the starting point 630 as the first starting point and perform a CAT4 LBT 626 during a gap duration 640 in the last symbol 614 of the slot 606. The CAT4 LBT may be based on a maximum CW size. The UE 115 may determine a CP extension length based on a first duration 642 between the first starting point 630 of the COT 610 and the beginning symbol 616 of the slot 608, which immediately succeeds the slot 606, and may apply a CP extension 644 having the CP extension length to the sidelink transmission 604. The CP extension length may be based on the starting point 630, and the last symbol 614 of the slot 606 may include the gap duration 640 and the first duration 642. Based on the CAT4 LBT 626 resulting in an LBT pass, the UE 115 may transmit the sidelink transmission 604 with the CP extension 644, the transmission beginning at the starting point 630.

In some aspects, the UE 115 may select the starting point 632 as the first starting point and perform a CAT4 LBT 628 during a gap duration 646 in the last symbol 614 of the slot 606. The CAT4 LBT may be based on a maximum CW size. The UE 115 may determine a CP extension length based on a first duration 648 between the first starting point 632 of the COT 610 and the beginning symbol 616 of the slot 608, which immediately succeeds the slot 606, and may apply a CP extension 650 having the CP extension length to the sidelink transmission 604. The CP extension length may be based on the starting point 632, and the last symbol 614 of the slot 606 may include the gap duration 646 and the first duration 648. Based on the CAT4 LBT 628 resulting in an LBT pass, the UE 115 may transmit the sidelink transmission 604 with the CP extension 650, the transmission beginning at the starting point 632.

The UE 115 may perform similar actions discussed above for transmitting the sidelink transmission 604 if the UE 115 selects the starting point 634 or 636. If the UE 115 selects the starting point 638 as the first starting point and performs a CAT4 LBT 680 during a gap duration 652 in the last symbol 614 of the slot 606, it may be unnecessary for the UE 115 to determine a CP extension length between the first starting point 638 of the COT 610 and a start of the beginning symbol 616 of the slot 608 and/or apply the a CP extension having the CP extension length to the sidelink communication 604 because the CP extension would be zero. Accordingly, if the CAT4 LBT 680 results in an LBT pass, the UE 115 may transmit the sidelink transmission 604 (without a CP extension) beginning at the starting point 638.

Figure 7:
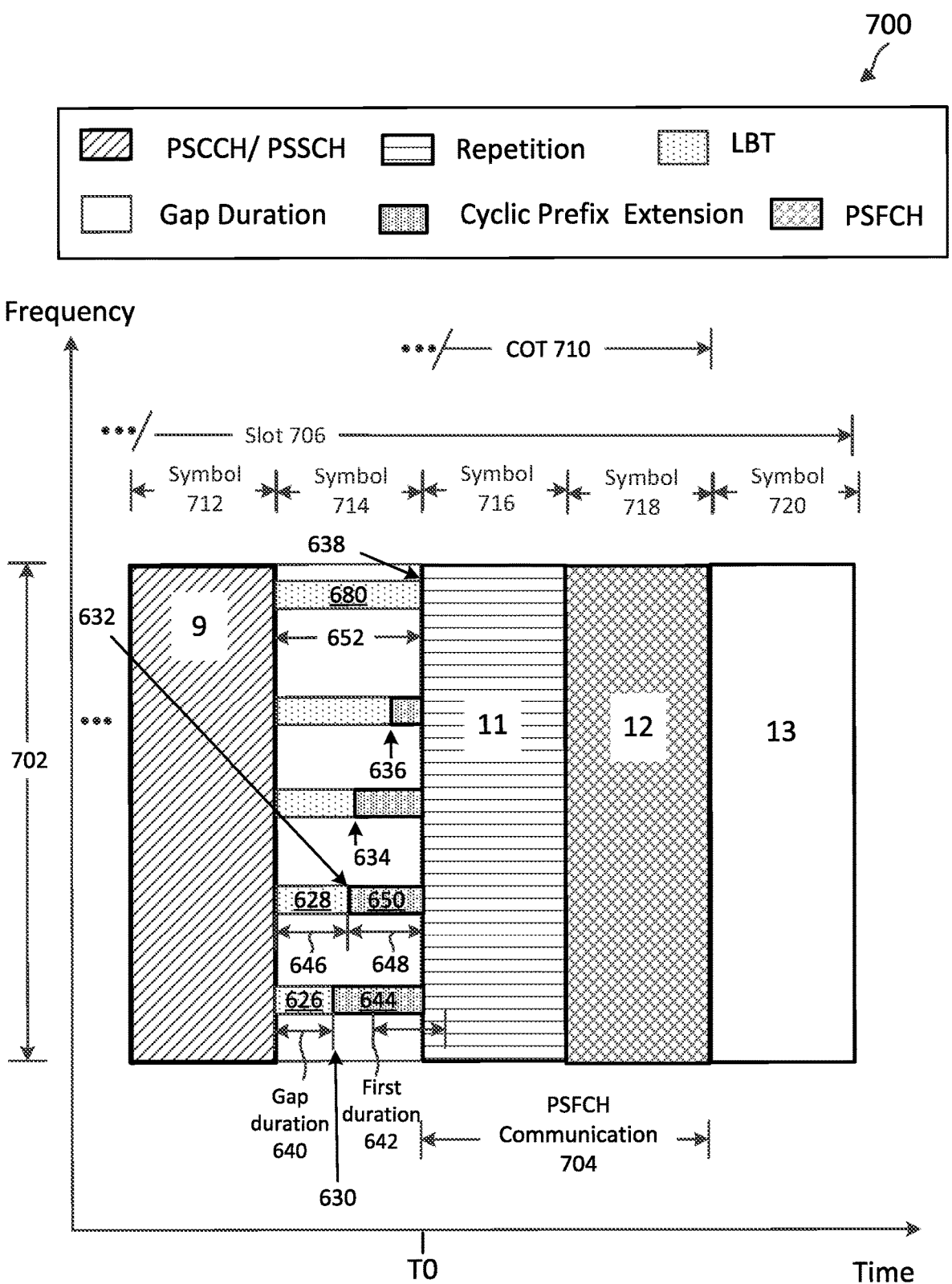
FIG. 7 illustrates a sidelink slot structure scheme for a sidelink transmission according to one or more aspects of the present disclosure.

FIG. 7 illustrates a sidelink slot structure scheme 700 for a sidelink transmission according to one or more aspects of the present disclosure. The scheme 700 may be employed by a UE 115 in a network such as the network 100. The network may support a plurality of starting points for sidelink transmissions between sidelink UEs. The x-axis represents time in some arbitrary units, and the y-axis represents frequency in some arbitrary units.

In the example illustrated in FIG. 7, a frequency band 702 may be a shared radio frequency band or an unlicensed band shared by a plurality of network operating entities. The frequency band 702 may, for example, have a BW of about 10 MHz or about 20 MHz and an SCS of about 15 kHz, about 30 kHz, or about 60 kHz. The frequency band 702 may be located at any suitable frequencies. In some aspects, the frequency band 702 may be located at about 2.5 GHz, 6 GHz, or 20 GHz.

A UE 115 may communicate with one or more other UEs over a sidelink using the sidelink slot structure scheme 700. For example, the UE 115 may communicate a PSFCH communication 704 in a slot 706 to another sidelink UE in the frequency band 702. The PSFCH communication 704 may be a slot-based communication during which the UE 115 may receive a HARQ ACK/NACK feedback or transmit a HARQ ACK/NACK feedback. The slot 706 may correspond to a slot 202 in FIG. 2 and may include a plurality of symbols. A duration of the slot 706 may span any suitable number of symbols (e.g., OFDM symbols). In some aspects, the duration of the slot 706 may correspond to one TTI, which may include about fourteen symbols.

The slot 706 may include fourteen symbols including a symbol 712, a symbol 714, a symbol 716, a symbol 718, and a symbol 720. The symbol 712 immediately precedes the symbol 714 and may be used to transmit PSCCH/PSSCH. The symbol 714 may be referred to as a gap symbol and at least a portion of the symbol 714 may be used by multiple UEs for performing an LBT to acquire a COT 710 for communication of the PSFCH communication 704 in the slot 706. The symbol 714 immediately precedes the symbol 716, and the symbol 716 may be a repetition of the symbol 718. The UE 115 may transmit a PSFCH communication 704 including PSFCH during the symbol 76 and the symbol 718, which immediately precedes the symbol 720. The symbol 720 is the last symbol of the slot 706 and may be a gap symbol that is used by multiple UEs for performing LBT to acquire a COT in the next slot for communicating communication signals in the COT.

The beginning symbol (not shown) of the slot 706 may be the first symbol "0" of the slot 706, the symbol "9" 712 may be the tenth symbol from the beginning symbol of the slot 706, the symbol "10" 714 may be the eleventh symbol from the beginning symbol of the slot 706, the symbol "11" 716 may be the twelfth symbol from the beginning symbol of the slot 706, the symbol "12" 718 may be the thirteenth symbol from the beginning symbol of the slot 706, and the symbol "13" 720 may be the fourteenth symbol from the beginning symbol of the slot 706. The symbol 720 is the last symbol of the slot 706 and may correspond to the symbol 614 in FIG. 6. For example, the plurality of starting points 630, 632, 634, 636, and 638 may be within the last symbol 720 of the slot 706.

Additionally or alternatively, the structure of the symbol 714 may be similar to the structure of the symbol 614 in FIG. 6 in terms of the plurality of starting points 630, 632, 634, 636, and 638, the gap duration(s), the first duration(s), and the UE 115 performing the CAT4 LBTs. In the example illustrated in FIG. 7, the UE 115 may select the starting point 630 as the first starting point and perform the CAT4 LBT 626 during the gap duration 640 in the symbol 714 after a PSSCH transmission in the slot 706. The UE 115 may determine a CP extension length based on the first duration 642 between the first starting point 630 of the COT 710 and a start of the symbol 716 of the slot 706 and may apply the CP extension 644 having the CP extension length to the PSFCH communication 704. The symbol 714 of the slot 706 may include the gap duration 640 and the first duration 642. Based on the CAT4 LBT 626 resulting in an LBT pass, the UE 115 may transmit the PSFCH communication 704 with the CP extension 644, the transmission beginning at the starting point 630.

The UE 115 may perform similar actions discussed above for transmitting the PSFCH communication 704 if the UE 115 selects the starting point 632, 634, or 636 in FIG. 7. If the UE 115 selects the starting point 638 as the first starting point in FIG. 7 and performs the CAT4 LBT 680 during the gap duration 652 in the symbol 714 of the slot 706, it may be unnecessary for the UE 115 to determine a CP extension length between the first starting point 638 of the COT 710 and a start of the symbol 716 of the slot 708 and/or apply the a CP extension having the CP extension length to the PSFCH communication 704 because the CP extension would be zero. In this example, if the CAT4 LBT 680 results in an LBT pass, the UE 115 may transmit the PSFCH communication 704 (without a CP extension) beginning at the starting point 638.

Figure 8:
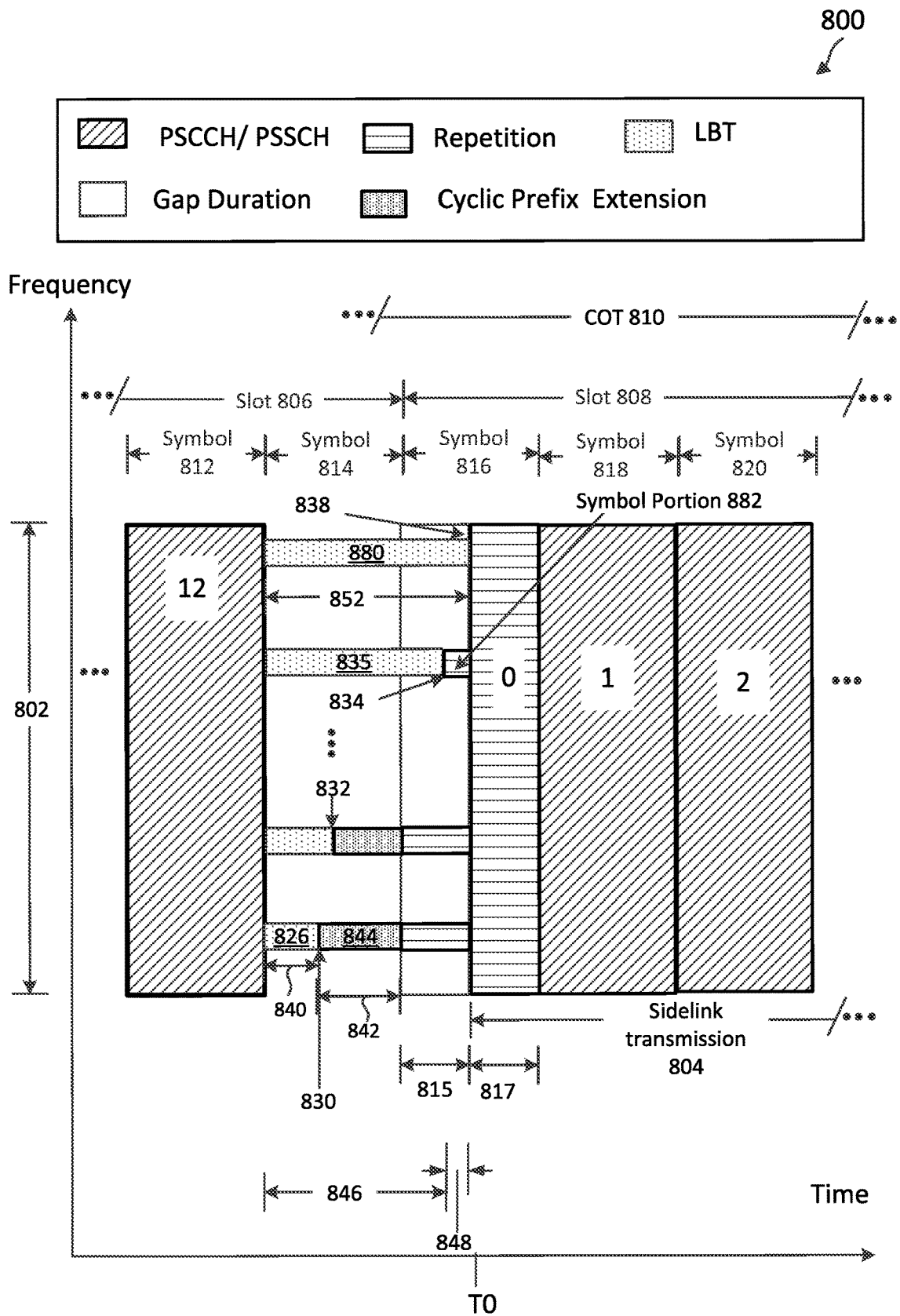
FIG. 8 illustrates a sidelink slot structure scheme for a sidelink transmission according to one or more aspects of the present disclosure.

FIG. 8 illustrates a sidelink slot structure scheme 800 for a sidelink transmission according to one or more aspects of the present disclosure. The scheme 800 may be employed by a UE 115 in a network such as the network 100. The network may support a plurality of starting points for sidelink transmissions between sidelink UEs. The x-axis represents time in some arbitrary units, and the y-axis represents frequency in some arbitrary units.

In the example illustrated in FIG. 8, a frequency band 802 may be a shared radio frequency band or an unlicensed band shared by a plurality of network operating entities. The frequency band 802 may, for example, have a BW of about 10 MHz or about 20 MHz and an SCS of about 15 kHz. The frequency band 802 may be located at any suitable frequencies. In some aspects, the frequency band 802 may be located at about 2.5 GHz, 6 GHz, or 20 GHz.

A UE 115 may communicate with one or more other UEs over a sidelink using the sidelink slot structure scheme 800. For example, the UE 115 may transmit a sidelink transmission 804 in a slot 808, which immediately precedes a slot 806, to another sidelink UE in the frequency band 802. The sidelink transmission 804 may be a slot-based transmission that includes PSCCH/PSSCH but is devoid of PSFCH. Additionally, the slot 806, 808 may correspond to a slot 202 in FIG. 2 and may include a plurality of symbols. A duration of the slot 806, 808 may span any suitable number of symbols (e.g., OFDM symbols). In some aspects, the duration of the slot 806, 808 may correspond to one TTI, which may include about fourteen symbols.

The slot 806 may include fourteen symbols including a symbol 812 and a symbol 814. The symbol 812 immediately precedes the symbol 814 and may be used to transmit PSCCH/PSSCH. The symbol 814 is the last symbol of the slot 806 and may be used by multiple UEs for performing an LBT to acquire a COT 810 for transmission in the next slot 808. The slot 808 may include fourteen symbols including a beginning symbol 816, a symbol 818 and a symbol 820. The beginning symbol 816 may include a first portion 815 and a second portion 817 of a full symbol in time. In some instances, the first portion 815 may be a first half symbol of the beginning symbol 816 and the second portion 817 may be a second half symbol of the beginning symbol 816. A half symbol may refer to the midpoint or about the midpoint of a full symbol in time. In other words, a half symbol may have a duration of half or about half of a full symbol. The beginning symbol 816 may immediately precede the symbol 818, which may immediately precede the symbol 820. The second portion 817 of the beginning symbol 816 may be a repetition of the symbol 818 and may include an AGC symbol. The UE 115 may transmit the sidelink transmission 804 including PSCCH/PSSCH during the symbols 816, 818, and 820.

A UE 115 may contend for the COT 810 in the frequency band 802, which may be a shared radio frequency band and/or an unlicensed band, for sidelink communication with another UE over a sidelink. To communicate the sidelink transmission 804 over the frequency band 802, the UE 115 may perform an LBT to contend for the COT 810 in the frequency band 802.

The UE 115 may determine a plurality of starting points 830, 832, 834, . . . , and 838 that has been predefined (offset values) before a start of the COT 810. The plurality of starting points 830, 832, 834, . . . , and 838 is within the last symbol 814 of the slot 806 and within the first portion 815 of the beginning symbol 816 of the slot 808. Accordingly, the plurality of starting points 830, 832, 834, . . . , and 838 spans the two slots 806 and 808.

Each starting point of the plurality of starting points 830, 832, 834, . . . , and 838 may be spaced apart by a starting point gap in-between. The second portion 817 of the symbol 816 may start at Time T0, and the starting point gap may be, for example, 9 μs. For example, the plurality of starting points may include ten starting points, where the starting point 830 may be at Time T0—81 μs, the starting point 832 may be at Time T0—72 μs, a starting point (not shown) may be at Time T0—63 μs, a starting point (not shown) may be at Time T0—54 μs, a starting point (not shown) may be at Time T0—45 μs, a starting point (not shown) may be at Time T0—36 μs, a starting point (not shown) may be at Time T0—27 μs, a starting point (not shown) may be at Time T0—18 μs, the starting point 834 may be at Time T0—9 μs, and the starting point 838 may be at Time T0, which is at a start of the second portion 817 of the beginning symbol 816 of the slot 808.

An OFDM transmission (e.g., sidelink transmission 804) may begin at the start of a slot or mini-slot symbol boundary. As will be discussed further below, the UE 115 may fill a gap between a selected starting point and the start of the first portion 815 with a CP extension if the selected starting point occurs before the beginning symbol 816 (e.g., before the first portion 815 of the beginning symbol 816) of the slot 808. If the UE 115 passes an LBT before the start of the mini-slot symbol boundary (e.g., Time T0), the UE 115 may transmit a CP extension until the start of the symbol boundary to block other nodes from accessing the channel. Additionally or alternatively, if the selected starting point occurs within the beginning symbol 816 (e.g., within the first portion 815 of the beginning symbol 816) of the slot 808, the UE 115 may puncture a portion of the first portion 815.

If the UE 115 selects the starting point 838 as the first starting point, it may be unnecessary for the UE 115 to transmit the sidelink communication 804 with a CP extension, as will be discussed further below. The plurality of starting points may be based on an SCS. For example, the number of starting points and/or the locations of the starting points within the symbols 814 and 816 may be based on the SCS.

The COT 810 may begin at a first starting point of the plurality of starting points 830, 832, 834, . . . , and 838 within the last symbol 814 of the slot 806 and/or the first portion 815 of the beginning symbol 816, as discussed in aspects of the present disclosure. For example, the UE 115 may start transmission of the sidelink transmission 804 at any one of the starting points of the plurality starting points 830, 832, 834, . . . , and 838.

In some instances, the UE 115 may perform a CAT4 LBT during the last symbol 814 of the slot 806 and/or during the first portion 815 of the beginning symbol 816 to contend for the COT 810. If the CAT4 LBT results in an LBT fail, the UE 115 may refrain from transmitting in the frequency band 802 for a time period and then perform CAT4 LBT again. If the CAT4 LBT results in an LBT pass, the UE 115 may proceed to use the COT 810 for sidelink communication and accordingly may transmit a sidelink transmission beginning at the first starting point. The transmission of the sidelink transmission 804 is conditioned on a successful CAT4 LBT. The UE 115 starts to perform the CAT4 LBT such that the CAT4 LBT is ready no later than the first starting point. An earlier CAT4 LBT based on a maximum CW size may be desirable.

In some examples, the UE 115 may select the first starting point from the plurality of starting points 830, 832, 834, . . . , and 838 in various ways. In some instances, the UE 115 may randomly select one of the plurality of starting points 830, 832, 834, . . . , and 838 to start transmission of the sidelink communication. In an instance, the UE 115 may select the first starting point based on a random number from the UE 115 implementation. In an instance, the UE 115 may select the first starting point based on the UE 115's configuration.

In some aspects, the UE 115 may select the starting point 830 as the first starting point and perform a CAT4 LBT 826, which can complete no later than the first starting point if the channel is empty. The starting point 830 occurs before the start of the beginning symbol 816 of the slot 808, and the UE 115 may pass the CAT4 LBT 826 before the start of the beginning symbol 816 of the slot 808. Accordingly, the UE 115 may determine a CP extension length based on a first duration 842 between the first starting point 830 of the COT 810 and the start of the beginning symbol 816 (e.g., the symbol boundary) of the slot 808, which immediately succeeds the slot 806, and may apply a CP extension 844 having the CP extension length to the sidelink transmission 804. Based on the first starting point 830 occurring before the start of the beginning symbol 816 of the slot 808, the UE 115 may transmit the sidelink transmission 804 with the CP extension 844, the transmission beginning at the starting point 830. The CP extension 844 may be the CP extension of the AGC symbol 816. The UE 115 may perform similar actions discussed above for transmitting the sidelink transmission 804 if the UE 115 selects a starting point that occurs before the start of the beginning symbol 816 of the slot 808 and/or the UE 115 passes the CAT4 LBT before the start of the beginning symbol 816 of the slot 808.

In some aspects, the UE 115 may select the starting point 834 as the first starting point and perform a CAT4 LBT 835, which can complete no later than the first starting point if the channel is empty. The starting point 834 occurs after the start of the beginning symbol 816 of the slot 808, and the UE 115 may pass the CAT4 LBT 826 after the start of the beginning symbol 816 of the slot 808. Accordingly, the UE 115 may puncture the portion between a start of the beginning symbol 816 until a start of the symbol portion 882. The symbol portion 882 and the second portion 817 of the beginning symbol 816 may include a partial AGC symbol, and the first portion 815 may immediately precede the partial AGC symbol. The AGC symbol may be punctured such that the remaining portion (e.g., the partial AGC symbol) is long enough for AGC purposes (e.g., at least 30 μs). The minimum portion of the AGC symbol may depend on the UE capability. Based on the first starting point occurring after the start of the beginning symbol 816 of the slot 808, the UE 115 may puncture a portion of the first portion 815 and transmit the sidelink transmission 804 beginning at the starting point 834. The UE 115 may perform similar actions discussed above for transmitting the sidelink transmission 804 if the UE 115 selects a starting point that occurs within the start of the beginning symbol 816 of the slot 808 and/or the UE 115 passes the CAT4 LBT after the start of the beginning symbol 816 of the slot 808.

If the UE 115 selects the starting point 838 in FIG. 8 as the first starting point and performs the CAT4 LBT 880 during the gap duration 852 in the symbol 814 and the first portion 815 of the symbol 816 of the slot 806, it may be unnecessary for the UE 115 to determine a CP extension length between the first starting point 838 of the COT 810 and the symbol 816 because the CP extension would be zero. The UE 115 may puncture the first portion 815 (e.g., puncture a portion between a start of the symbol 816 until a start of the second portion 817 of the symbol 816).

Figure 9:
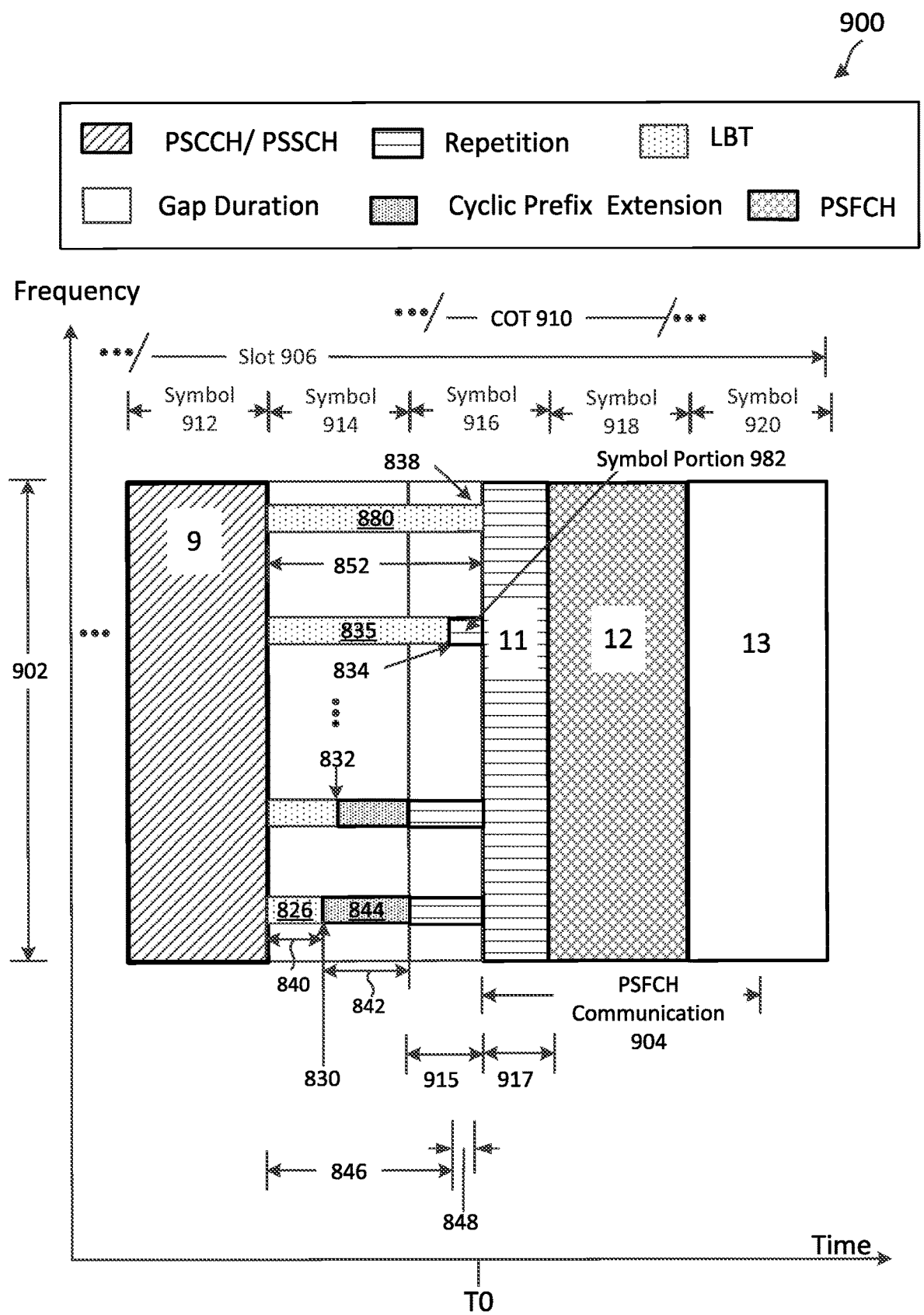
FIG. 9 illustrates a sidelink slot structure scheme for a sidelink transmission according to one or more aspects of the present disclosure.

FIG. 9 illustrates a sidelink slot structure scheme 900 for a sidelink transmission according to one or more aspects of the present disclosure. The scheme 900 may be employed by a UE 115 in a network such as the network 100. The network may support a plurality of starting points for sidelink transmissions between sidelink UEs. The x-axis represents time in some arbitrary units, and the y-axis represents frequency in some arbitrary units.

In the example illustrated in FIG. 9, a frequency band 902 may be a shared radio frequency band or an unlicensed band shared by a plurality of network operating entities. The frequency band 902 may, for example, have a BW of about 10 MHz or about 20 MHz and an SCS of about 15 kHz. The frequency band 902 may be located at any suitable frequencies. In some aspects, the frequency band 902 may be located at about 2.5 GHz, 6 GHz, or 20 GHz.

A UE 115 may communicate with one or more other UEs over a sidelink using the sidelink slot structure scheme 900. For example, the UE 115 may communicate a PSFCH communication 904 in a slot 906 to another sidelink UE in the frequency band 902. The PSFCH communication 904 may be a slot-based communication during which the UE 115 may receive a HARQ ACK/NACK feedback or transmit a HARQ ACK/NACK feedback. The slot 906 may correspond to a slot 202 in FIG. 2 and may include a plurality of symbols. A duration of the slot 906 may span any suitable number of symbols (e.g., OFDM symbols). In some aspects, the duration of the slot 906 may correspond to one TTI, which may include about fourteen symbols.

The slot 906 may include fourteen symbols including a symbol 912, a symbol 914, a symbol 916, a symbol 918, and a symbol 920. The symbol 912 immediately precedes the symbol 914 and may be used to transmit PSCCH/PSSCH. The symbol 914 may be referred to a gap symbol and at least a portion of the symbol 914 may be used by multiple UEs for performing an LBT to acquire a COT 910 for communication of the PSFCH communication 904 in the slot 906. The symbol 914 immediately precedes the symbol 916, and a second portion 917 of the symbol 916 may be a repetition of the symbol 918. The UE 115 may transmit a PSFCH communication 904 including PSFCH during the second portion 917 of the symbol 916 and the symbol 918, which immediately precedes the symbol 920. The symbol 920 is the last symbol of the slot 906 and may be a gap symbol that is used by multiple UEs for performing an LBT to acquire a COT in the next slot for communicating communication signals in the COT.

The beginning symbol (not shown) of the slot 906 may be the first symbol "0" of the slot 906, the symbol "9" 912 may be the tenth symbol from the beginning symbol of the slot 906, the symbol "10" 914 may be the eleventh symbol from the beginning symbol of the slot 906, the symbol "11" 916 may be the twelfth symbol from the beginning symbol of the slot 906, the symbol "12" 918 may be the thirteenth symbol from the beginning symbol of the slot 906, and the symbol "13" 920 may be the fourteenth symbol from the beginning symbol of the slot 906. The symbol 920 is the last symbol of the slot 906 and may correspond to the symbol 814 in FIG. 8. For example, the plurality of starting points 830, 832, 834, . . . , and 838 may be within the last symbol 920 of the slot 906.

Additionally or alternatively, the structure of the symbols 914 and 916 may be similar to the structure of the symbols 814 and 816 in FIG. 8 in terms of the plurality of starting points 830, 832, 834, . . . , and 838, the gap duration(s), the first duration(s), and the UE 115 performing the CAT4 LBTs. In the example illustrated in FIG. 9, the UE 115 may select the starting point 830 as the first starting point and perform the CAT4 LBT 826, which can complete no later than the first starting point if the channel is empty. The starting point 830 occurs before the start of the symbol 916 of the slot 906, and the UE 115 may pass the CAT4 LBT 826 before the start of the symbol 916 of the slot 906. Accordingly, the UE 115 may determine a CP extension length based on the first duration 842 between the starting point 830 of the COT 910 and the start of the symbol 916 (e.g., the symbol boundary) of the slot 906. The UE 115 may apply the CP extension 844 having the CP extension length to the PSFCH communication 904. The CP extension length may be based on the starting point 830, and symbol 914 and the first portion 915 of the symbol 916 of the slot 906 may include the gap duration 840 and the first duration 842. Based on the first starting point 830 occurring before the start of the symbol 916 of the slot 906, the UE 115 may transmit the PSFCH communication 904 with the CP extension 844, the transmission beginning at the starting point 830. The CP extension 844 may be the CP extension of the AGC symbol 916. The UE 115 may perform similar actions discussed above for transmitting the PSFCH communication 904 if the UE 115 selects a starting point that occurs before the start of the symbol 916 of the slot 906 in FIG. 9 and/or the UE 115 passes the CAT4 LBT before the start of the symbol 916 of the slot 906.

In some aspects, the UE 115 may select the starting point 834 as the first starting point and perform a CAT4 LBT 835, which can complete no later than the first starting point if the channel is empty. The starting point 834 occurs after the start of the symbol 916 of the slot 906, and the UE 115 may pass the CAT4 LBT 835 after the start of the symbol 916 of the slot 906. Accordingly, the UE 115 may puncture the first portion 915 of the symbol 916. The second portion 917 of the symbol 916 may include a partial AGC symbol, and the first portion 915 may immediately precede the partial AGC symbol. The partial AGC symbol may be at least 30 μs. Based on the CAT4 LBT 835 resulting in an LBT pass after the start of the symbol 916 of the slot 906, the UE 115 may puncture a portion of the first portion 915 of the symbol 916 and communicate the PSFCH communication 904, the communication beginning at the starting point 834. For example, the UE 115 may puncture a portion between a start of the symbol 916 until a start of the symbol portion 982. The UE 115 may perform similar actions discussed above for communicating the PSFCH communication 904 if the UE 115 selects a starting point that occurs within the start of the symbol 916 of the slot 906 and/or the UE 115 passes the CAT4 LBT after the start of the symbol 916 of the slot 906.

If the UE 115 selects the starting point 838 in FIG. 9 as the first starting point and performs the CAT4 LBT 880 during the gap duration 852 in the symbol 914 and the first portion 915 of the symbol 916 of the slot 906, it may be unnecessary for the UE 115 to determine a CP extension length between the first starting point 838 of the COT 910 and the second portion 917 of the symbol 916 because the CP extension would be zero. The UE 115 may puncture the first portion 915 (e.g., puncture a portion between a start of the symbol 916 until a start of the second portion 917 of the symbol 916).

In some aspects, the plurality of starting points may be function of whether the UE 115 will transmit the sidelink communication using a full BW or a partial BW (e.g., depending on the amount of data for the sidelink transmission). A first set of starting points of the plurality of starting points may be associated with the UE 115 occupying a full bandwidth, and a single starting point of the plurality of starting points may be associated with the UE 115 occupying a partial bandwidth of the full bandwidth. The partial BW can be a frequency interlace (RBs spaced apart) or a group of contiguous RBs.

In some instances, each starting point of the first set of starting points occurs before the single starting point, and the UE 115 may perform the LBT in the full bandwidth if the first starting point is within the first set of starting points and may perform the LBT in the partial bandwidth of the full bandwidth if the first starting point is absent from the first set of starting points. In some instances, each starting point of the first set of starting points occurs after the single starting point, and the UE 115 may perform the LBT in the full bandwidth if first starting point is within the first set of starting points and may perform the LBT in the partial bandwidth of the full bandwidth if the first starting point is absent from the first set of starting points. In some instances, the single starting point is time-varying, and the UE 115 may perform the LBT in the full bandwidth if the first starting point is within the first set of starting points and may perform the LBT in the partial bandwidth of the full bandwidth if the first starting point is absent from the first set of starting points.

Figure 10:
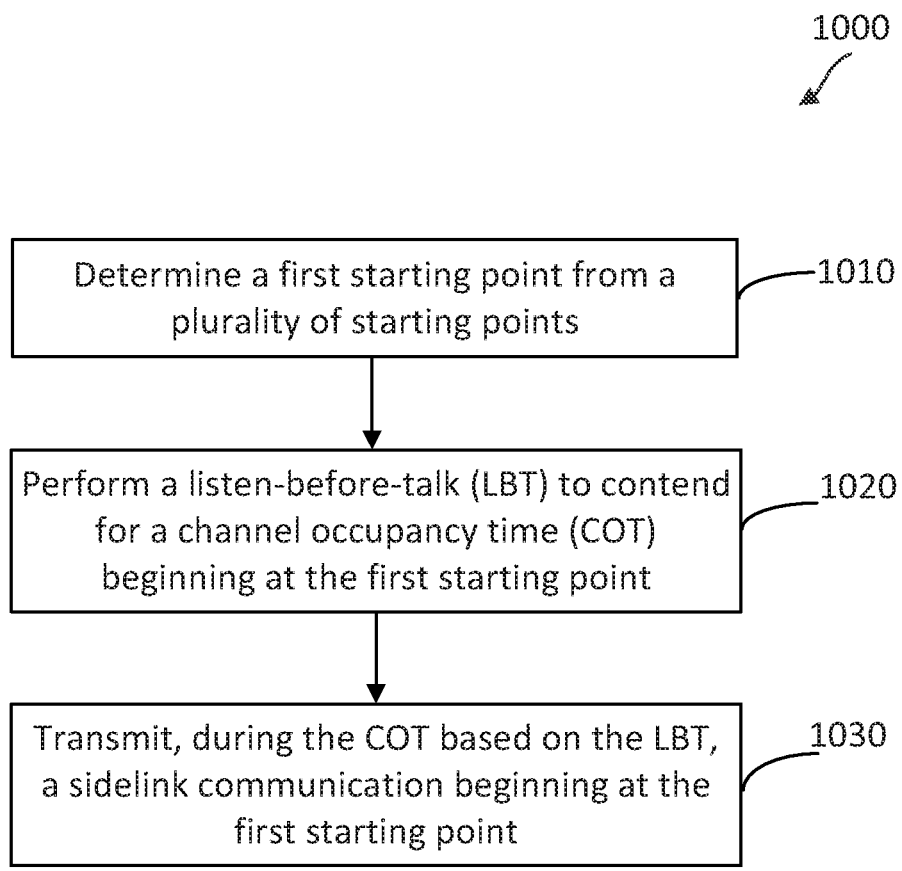
FIG. 10 illustrates a flow diagram of a communication method for communicating a sidelink communication according to one or more aspects of the present disclosure.

FIG. 10 illustrates a flow diagram of a communication method 1000 for communicating a sidelink communication according to one or more aspects of the present disclosure. Blocks of the method 1000 can be executed by a computing device (e.g., a processor, processing circuit, and/or other suitable component) of a wireless communication device. In some aspects, the wireless communication device is a UE (e.g., UEs 115 and/or UE 400) that may utilize one or more components, such as the processor 402, the memory 404, the COT module 408, the sidelink communication module 409, the transceiver 410, and/or the antennas 416 to execute the blocks of the method 1000. The method 1000 may employ similar aspects as in the transmission frame structure 200 in FIG. 2, the CAT4 LBT scheme 300 in FIG. 3, the sidelink slot structure scheme 600 in FIG. 6, the sidelink slot structure scheme 700 in FIG. 7, the sidelink slot structure scheme 800 in FIG. 8, and/or the sidelink slot structure scheme 900 in FIG. 9. As illustrated, the method 1000 includes a number of enumerated blocks, but aspects of the method 1000 may include additional blocks before, after, and/or in between the enumerated blocks. In some aspects, one or more of the enumerated blocks may be omitted or performed in a different order.

At block 1010, the method 1000 includes determining a first starting point from a plurality of starting points. In an example, the UE 115 or UE 400 (e.g., via the processor 402) determines the first starting point from the plurality of starting points. The plurality of starting points may be preconfigured. In some instances, the plurality of starting points may span one full symbol (e.g., symbol 614 in FIG. 6 and symbol 714 in FIG. 7). In some instances, the plurality of starting points may span one full symbol and a portion of a second symbol (e.g., symbol 814 and the first portion 815 of the symbol 816 in FIG. 8 and symbol 914 and the first portion 915 of the symbol 916 in FIG. 9). The UE 115 or UE 400 (e.g., via the processor 402) may select the first starting point randomly based on a uniform distribution function among the configured plurality of starting points. The plurality of starting points may be based on an SCS, which may be, for example, about 15 kHz, about 30 kHz, or about 60 kHz.

In some aspects, a first duration between at least two starting points of the plurality of starting points may be 9 μs, and the plurality of starting points may occur before the COT beginning at the first starting point. In some aspects, a first duration between a first starting point and each of the starting points of the plurality of starting points is a multiple of 9 μs, and the plurality of starting points may occur before the COT beginning at the first starting point.

At block 1020, the method 1000 includes performing an LBT to contend for a COT beginning at the first starting point. In an example, the UE 115 or UE 400 (e.g., via the processor 402) performs the LBT to contend for the COT beginning at the first starting point. The LBT may be a CAT4 LBT as discussed in relation to, for example, aspects of FIG. 3. The CAT4 LBT may be based on a maximum contention window size.

At block 1030, the method 1000 includes transmitting, during the COT based on the LBT, a sidelink communication beginning at the first starting point. In an example, the UE 115 or UE 400 (e.g., via the transceiver 410) transmit, during the COT based on the LBT, a sidelink communication beginning at the first starting point. The transmission of the sidelink transmission 604 is conditioned on a successful CAT4 LBT. For example, if the CAT4 LBT results in an LBT fail, the UE 115 may refrain from transmitting in the frequency band for a time period and then may perform CAT4 LBT again. If the CAT4 LBT results in an LBT pass, the UE 115 may proceed to use the COT for sidelink communication and accordingly may transmit the sidelink transmission beginning at the first starting point. In some instances, the sidelink transmission is devoid of a PSFCH. In some instances, the UE 115 or the UE 400 transmits the sidelink transmission including the PSSCH. The UE 115 or the UE 400 may transmit the sidelink transmission with the CP extension. The CP extension length may be based on the first starting point.

In some aspects, the UE 115 or UE 400 may perform the LBT during the last symbol of a first slot. In some instances, the plurality of starting points is entirely within the last symbol of the first slot, and the UE 115 or UE 400 may and determine a CP extension length based on a first duration between the first starting point of the COT and the beginning symbol of a second slot immediately succeeding the first slot. The UE 115 or UE 400 may apply a CP extension having the CP extension length to the sidelink transmission and transmit the sidelink transmission with the CP extension. In some examples, the UE 115 or the UE 400 may perform the LBT during a gap duration in the last symbol of the first slot, and the last symbol of the first slot includes the gap duration and the first duration. The UE 115 or the UE 400 may transmit the sidelink transmission with the CP extension during the first duration.

In some instances, the plurality of starting points is within the last symbol of the first slot and a first portion of the beginning symbol of the second slot. For example, the plurality of starting points may span two adjacent symbols. The UE 115 or the UE 400 (e.g., via the processor 402) may puncture a first portion of the beginning symbol of the second slot. A second portion of the beginning symbol may include an AGC symbol, and the first portion may immediately precede the AGC symbol.

In some aspects, the UE 115 or the UE 400 may perform (e.g., via the processor 402) the LBT during a first symbol after a PSSCH transmission in a slot. The UE 115 or the UE 400 may determine a CP extension length based on a first duration between the first starting point of the COT and a second symbol of the slot immediately succeeding the first symbol. The UE 115 or the UE 400 may apply a CP extension having the CP extension length to the sidelink transmission and transmit the sidelink transmission with the CP extension. The UE 115 or the UE 400 (e.g., via the transceiver 410) may communicating a PSFCH during a third symbol of the slot, where the third symbol is between the second symbol and the last symbol in the slot. For example, the third symbol may immediately succeed the second symbol in the slot and immediately precede the last symbol in the slot.

In some aspects, the UE 115 or the UE 400 (e.g., via the processor 402) may perform the LBT during a first symbol after a PSSCH transmission in a slot and during a first portion of a second symbol immediately succeeding the first symbol. If the first starting point occurs within the first portion of the second symbol, the UE 115 or the UE 400 may puncture the first portion of the second symbol. A second portion of the second symbol may include an AGC symbol, and the first portion may immediately precede the AGC symbol. The UE 115 or the UE 400 (e.g., via the transceiver 410) may communicate a PSFCH during a third symbol of the slot, where the third symbol is between the second symbol and the last symbol in the slot. The third symbol may immediately succeed the second symbol in the slot and immediately precede the last symbol in the slot. The plurality of starting points may be based on an SCS of, for example, 15 kHz.

Figure 11:
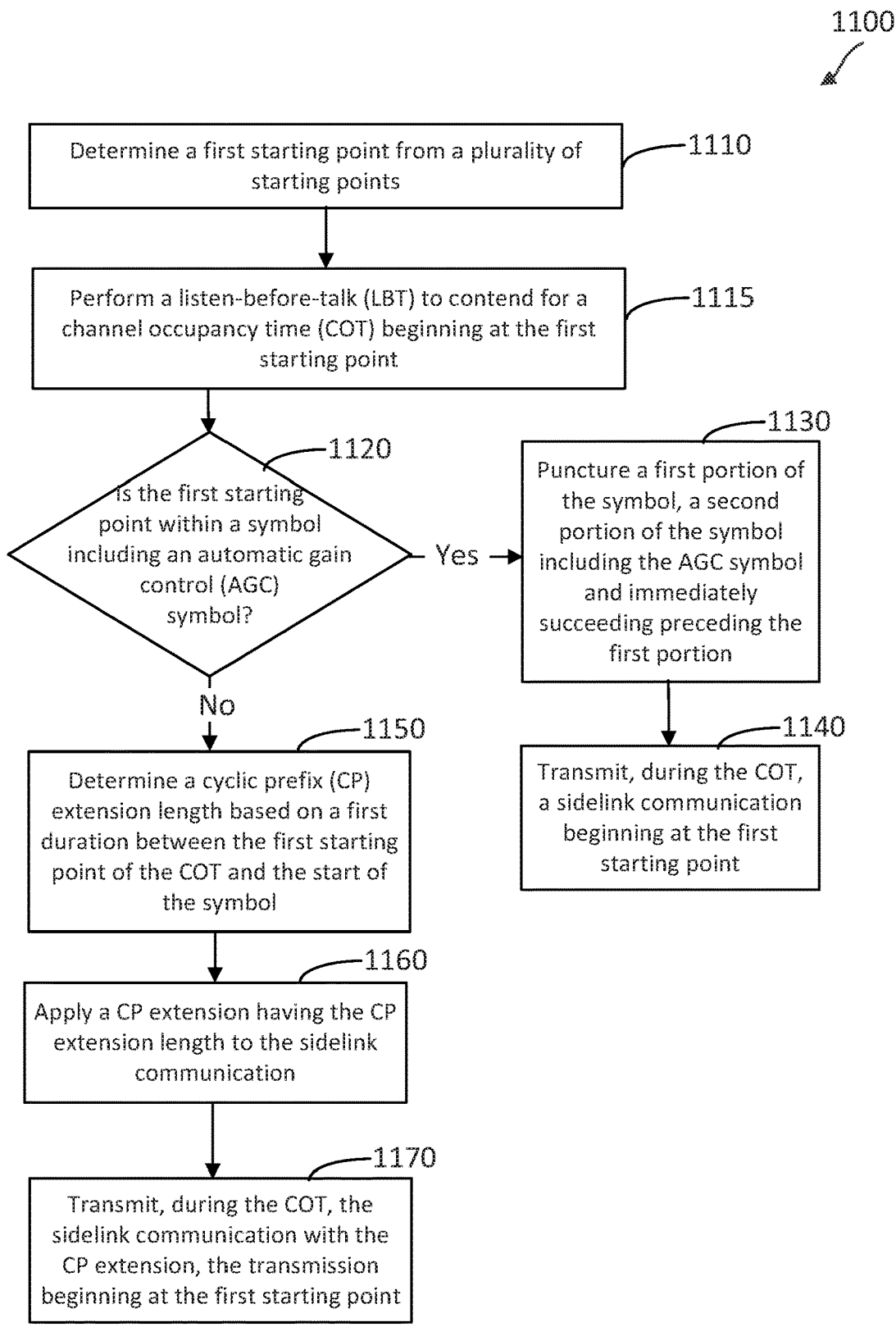
FIG. 11 illustrates a flow diagram of a communication method for communicating a sidelink communication according to one or more aspects of the present disclosure.

FIG. 11 illustrates a flow diagram of a communication method 1100 for communicating a sidelink communication according to one or more aspects of the present disclosure. Blocks of the method 1100 can be executed by a computing device (e.g., a processor, processing circuit, and/or other suitable component) of a wireless communication device. In some aspects, the wireless communication device is a UE (e.g., UEs 115 and/or UE 400) that may utilize one or more components, such as the processor 402, the memory 404, the COT module 408, the sidelink communication module 409, the transceiver 410, and/or the antennas 416 to execute the blocks of the method 1000. The method 1100 may employ similar aspects as in the transmission frame structure 200 in FIG. 2, the CAT4 LBT scheme 300 in FIG. 3, the sidelink slot structure scheme 600 in FIG. 6, the sidelink slot structure scheme 700 in FIG. 7, the sidelink slot structure scheme 800 in FIG. 8, and/or the sidelink slot structure scheme 900 in FIG. 9. As illustrated, the method 1100 includes a number of enumerated blocks, but aspects of the method 1100 may include additional blocks before, after, and/or in between the enumerated blocks. In some aspects, one or more of the enumerated blocks may be omitted or performed in a different order.

At block 1110, the method 1100 includes determining a first starting point from a plurality of starting points. In an example, the UE 115 or UE 400 (e.g., via the processor 402) determines the first starting point from the plurality of starting points. The plurality of starting points may be preconfigured. In some instances, the plurality of starting points may span one full symbol (e.g., symbol 614 in FIG. 6 and symbol 714 in FIG. 7). In some instances, the plurality of starting points may span one full symbol and a portion of a second symbol (e.g., symbol 814 and the first portion 815 of the symbol 816 in FIG. 8 and symbol 914 and the first portion 915 of the symbol 916 in FIG. 9). The UE 115 or UE 400 (e.g., via the processor 402) may select the first starting point randomly based on a uniform distribution function among the configured plurality of starting points. The plurality of starting points may be based on an SCS, which may be, for example, about 15 kHz, about 30 kHz, or about 60 kHz.

At block 1115, the method 1100 includes performing a listen-before-talk to contend for a channel occupancy time (COT) beginning at the first starting point. In an example, the UE 115 or UE 400 (e.g., via the processor 402) performs the LBT to contend for the COT beginning at the first starting point. The LBT may be a CAT4 LBT as discussed in relation to, for example, aspects of FIG. 3. The CAT4 LBT may be based on a maximum contention window size.

At block 1120, the method 1100 includes determining whether the first starting point is within a symbol including an automatic gain control (AGC) symbol. In an example, the UE 115 or the UE 400 (e.g., via the processor 402) may determining whether the first starting point is within a symbol including an AGC symbol.

If the first starting point is within a symbol including the AGC symbol, the process flow may proceed from block 1120 to block 1130. At block 1130, the method 1100 includes puncturing a first portion of the symbol, a second portion of the symbol including the AGC symbol and immediately succeeding preceding the first portion. In an example, the UE 115 or the UE 400 (e.g., via the processor 402) may puncture the first portion of the symbol, a second portion of the symbol including the AGC symbol and immediately succeeding preceding the first portion. At block 1140, the method 1100 includes transmitting, during the COT, a sidelink communication beginning at the first starting point. In an example, the UE 115 or the UE 400 (e.g., via the transceiver 410) may transmit, during the COT, a sidelink communication beginning at the first starting point.

If the first starting point is not within a symbol including the AGC symbol, the process flow may proceed from block 1120 to block 1150. At block 1150, the method 1100 includes determining a cyclic prefix (CP) extension length based on a first duration between the first starting point of the COT and the start of the symbol. In an example, the UE 115 or the UE 400 (e.g., via the processor 402) may determine the CP extension length based on a first duration between the first starting point of the COT and the start of the symbol. For example, the UE 115 or the UE 400 may determine the CP extension length in relation to, for example, aspects of FIGS. 6-9.

At block 1160, the method 1100 includes applying a CP extension having the CP extension length to the sidelink communication. In an example, the UE 115 or the UE 400 (e.g., via the processor 402) may apply the CP extension having the CP extension length to the sidelink communication. For example, the UE 115 or the UE 400 may apply the CP extension having the CP extension length to the sidelink communication in relation to, for example, aspects of FIGS. 6-9. At block 1170, the method 1100 includes transmitting, during the COT, the sidelink communication with the CP extension, the transmission beginning at the first starting point. In an example, the UE 115 or the UE 400 (e.g., via the transceiver 410) may transmit, during the COT, the sidelink communication with the CP extension, the transmission beginning at the first starting point.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
    determining a first starting point from a plurality of starting points based on a random selection;
    performing a listen-before-talk (LBT) to contend for a channel occupancy time (COT) beginning at the first starting point by performing the LBT during the last symbol of a first slot;
    determining a cyclic prefix (CP) extension length based on a first duration between the first starting point of the COT and a beginning symbol of a second slot immediately succeeding the first slot;
    applying a CP extension having the CP extension length to a sidelink communication; and
    transmitting, during the COT based on the LBT and beginning at the first starting point, a sidelink communication with the CP extension.

2. The method of claim 1, wherein the plurality of starting points is within the last symbol of the first slot.

3. The method of claim 2, wherein the plurality of starting points is based on a subcarrier spacing (SCS).

4. The method of claim 3, wherein the SCS is at least one of 15 kHz, 30 kHz, or 60 kHz.

5. The method of claim 2, wherein the performing the LBT includes performing the LBT during a gap duration in the last symbol of the first slot, and the last symbol of the first slot includes the gap duration and the first duration, and wherein the transmitting the sidelink communication with the CP extension includes transmitting the CP extension during the first duration.

6. The method of claim 1, wherein the plurality of starting points is within a first portion of the beginning symbol of the second slot.

7. The method of claim 6, wherein the first starting point occurs within the beginning symbol of the second slot.

8. The method of claim 7, further comprising:
    puncturing the first portion of the beginning symbol of the second slot, a second portion of the beginning symbol including an automatic gain control (AGC) symbol, and the first portion immediately preceding the AGC symbol.

9. The method of claim 1, wherein the sidelink communication is devoid of a physical sidelink feedback channel (PSFCH).

10. The method of claim 1, wherein the transmitting the sidelink communication with the CP extension includes transmitting a physical sidelink shared channel (PSSCH).

11. The method of claim 1, wherein the CP extension length is based on the first starting point.

12. The method of claim 1, wherein the performing the LBT includes performing the LBT during a first symbol after a PSSCH transmission in a slot, the method further comprising:
    determining a CP extension length based on a first duration between the first starting point of the COT and a second symbol of the slot immediately succeeding the first symbol; and
    applying a CP extension having the CP extension length to the sidelink communication, wherein the transmitting the sidelink communication includes transmitting the sidelink communication with the CP extension.

13. The method of claim 12, further comprising:
    communicating a PSFCH during a third symbol of the slot, the third symbol being between the second symbol and the last symbol in the slot.

14. The method of claim 13, wherein the third symbol immediately succeeds the second symbol in the slot and immediately precedes the last symbol in the slot.

15. The method of claim 12, wherein the plurality of starting points is based on a subcarrier spacing (SCS), and the SCS is at least one of 15 kHz, 30 kHz, or 60 kHz.

16. A method of wireless communication performed by a user equipment (UE), the method comprising:
    determining a first starting point from a plurality of starting points based on a random selection;
    performing a listen-before-talk (LBT) to contend for a channel occupancy time (COT) beginning at the first starting point, wherein the performing the LBT includes performing the LBT during a first symbol after a PSSCH transmission in a slot and during a first portion of a second symbol immediately succeeding the first symbol, and the first starting point occurs within the first portion of the second symbol;
    puncturing the first portion of the second symbol, wherein a second portion of the second symbol includes an AGC symbol and the first portion immediately precedes the AGC symbol; and
    transmitting, during the COT based on the LBT, a sidelink communication beginning at the first starting point.

17. The method of claim 16, further comprising:
    communicating a PSFCH during a third symbol of the slot, the third symbol being between the second symbol and the last symbol in the slot.

18. The method of claim 17, wherein the third symbol immediately succeeds the second symbol in the slot and immediately precedes the last symbol in the slot.

19. The method of claim 18, wherein the plurality of starting points is based on a subcarrier spacing (SCS), and the SCS is 15 kHz.

20. A method of wireless communication performed by a user equipment (UE), the method comprising:
    determining a first starting point from a plurality of starting points based on a random selection;
    performing a listen-before-talk (LBT) to contend for a channel occupancy time (COT) beginning at the first starting point; and
    transmitting, during the COT based on the LBT, a sidelink communication beginning at the first starting point;
    wherein a first set of starting points of the plurality of starting points is associated with the UE occupying a full bandwidth, and a single starting point of the plurality of starting points is associated with the UE occupying a partial bandwidth of the full bandwidth.

21. The method of claim 20, wherein each starting point of the first set of starting points occurs before the single starting point, wherein the performing the LBT includes performing the LBT in the full bandwidth based on the first starting point being within the first set of starting points, and wherein the performing the LBT includes performing the LBT in the partial bandwidth of the full bandwidth based on the first starting point being absent from the first set of starting points.

22. The method of claim 20, wherein each starting point of the first set of starting points occurs after the single starting point, wherein the performing the LBT includes performing the LBT in the full bandwidth based on first starting point being within the first set of starting points, and wherein the performing the LBT includes performing the LBT in the partial bandwidth of the full bandwidth based on the first starting point being absent from the first set of starting points.

23. The method of claim 20, wherein the single starting point is time-varying, wherein the performing the LBT includes performing the LBT in the full bandwidth based on the first starting point being within the first set of starting points, and wherein the performing the LBT includes performing the LBT in the partial bandwidth of the full bandwidth based on the first starting point being absent from the first set of starting points.

24. A method of wireless communication performed by a user equipment (UE), the method comprising:
    determining a first starting point from a plurality of starting points based on a random selection;
    performing a listen-before-talk (LBT) to contend for a channel occupancy time (COT) beginning at the first starting point; and
    transmitting, during the COT based on the LBT, a sidelink communication beginning at the first starting point;
    wherein a first duration between at least two starting points of the plurality of starting points is 9 μs, and the plurality of starting points occurs before the COT beginning at the first starting point.

25. A method of wireless communication performed by a user equipment (UE), the method comprising:
    determining a first starting point from a plurality of starting points based on a random selection;
    performing a listen-before-talk (LBT) to contend for a channel occupancy time (COT) beginning at the first starting point; and
    transmitting, during the COT based on the LBT, a sidelink communication beginning at the first starting point;
    wherein a first duration between a first starting point and each of the starting points of the plurality of starting points is a multiple of 9 μs, and the plurality of starting points occurs before the COT beginning at the first starting point.

26. The method of claim 1, wherein the random selection is based on a uniform distribution function among the plurality of starting points.

27. A user equipment (UE), comprising:
    a processor configured to:
        determine a first starting point from a plurality of starting points based on a random selection; and
        perform a listen-before-talk (LBT) to contend for a channel occupancy time (COT) beginning at the first starting point by performing the LBT during the last symbol of a first slot;
        determine a cyclic prefix (CP) extension length based on a first duration between the first starting point of the COT and a beginning symbol of a second slot immediately succeeding the first slot; and
        apply a CP extension having the CP extension length to a sidelink communication; and
    a transceiver configured to transmit, during the COT based on the LBT and beginning at the first starting point, a sidelink communication with the CP extension.

28. A non-transitory computer-readable medium having program code recorded thereon executable by one or more processors for wireless communication by a sidelink user equipment (UE), the program code comprising:
    code for causing the sidelink UE to determine a first starting point from a plurality of starting points based on a random selection;
    code for causing the sidelink UE to perform a listen-before-talk (LBT) to contend for a channel occupancy time (COT) beginning at the first starting point by performing the LBT during the last symbol of a first slot;
    code for causing the sidelink UE to transmit, during the COT based on the LBT, a sidelink communication beginning at the first starting point;
    code for determining a cyclic prefix (CP) extension length based on a first duration between the first starting point of the COT and a beginning symbol of a second slot immediately succeeding the first slot; and
    code for applying a CP extension having the CP extension length to a sidelink communication, wherein the transmitting the sidelink communication includes transmitting the sidelink communication with the CP extension.

29. A user equipment (UE) comprising:
    means for determining a first starting point from a plurality of starting points based on a random selection;
    means for performing a listen-before-talk (LBT) to contend for a channel occupancy time (COT) beginning at the first starting point by performing the LBT during the last symbol of a first slot;
    means for determining a cyclic prefix (CP) extension length based on a first duration between the first starting point of the COT and a beginning symbol of a second slot immediately succeeding the first slot;
    means for applying a CP extension having the CP extension length to a sidelink communication, wherein the transmitting the sidelink communication includes transmitting the sidelink communication with the CP extension; and
    means for transmitting, during the COT based on the LBT, a sidelink communication beginning at the first starting point.

* * * * *